United States Patent
Purri et al.

(10) Patent No.: US 10,108,767 B1
(45) Date of Patent: Oct. 23, 2018

(54) METHODS, SYSTEMS, AND COMPUTER PROGRAM PRODUCT FOR IMPLEMENTING DEADLOCK DETECTION WITH FORMAL VERIFICATION TECHNIQUES IN AN ELECTRONIC DESIGN

(71) Applicant: Cadence Design Systems, Inc., San Jose, CA (US)

(72) Inventors: Victor Markus Purri, Austin, TX (US); Michael Dennis Pedneau, Austin, TX (US); Lars Lundgren, Mölnlycke (SE); Pradeep Goyal, Ghaziabad (IN)

(73) Assignee: Cadence Design Systems, Inc., San Jose, CA (US)

( * ) Notice: Subject to any disclaimer, the term of this patent is extended or adjusted under 35 U.S.C. 154(b) by 39 days.

(21) Appl. No.: 15/282,627

(22) Filed: Sep. 30, 2016

(51) Int. Cl.
G06F 17/50 (2006.01)

(52) U.S. Cl.
CPC ........ G06F 17/504 (2013.01); G06F 2217/06 (2013.01)

(58) Field of Classification Search
CPC ............................ G06F 17/504; G06F 2217/06
See application file for complete search history.

(56) References Cited

U.S. PATENT DOCUMENTS

| | | | |
|---|---|---|---|
| 6,408,262 B1 * | 6/2002 | Leerberg | G06F 11/3608 703/2 |
| 6,421,808 B1 * | 7/2002 | McGeer | G06F 17/5022 703/14 |
| 6,874,135 B2 * | 3/2005 | Gupta | G06F 17/5022 716/108 |
| 6,985,840 B1 * | 1/2006 | Hsu | G01R 31/3181 703/14 |
| 7,124,383 B2 * | 10/2006 | Chen | G06F 17/504 716/106 |
| 7,257,786 B1 * | 8/2007 | Kukula | G06F 17/5081 703/2 |
| 7,283,945 B2 * | 10/2007 | Rajan | G06F 11/3608 703/14 |
| 8,316,332 B1 | 11/2012 | Goyal et al. | |
| 8,381,148 B1 * | 2/2013 | Loh | G06F 17/505 703/16 |
| 8,612,905 B1 | 12/2013 | Goyal et al. | |
| 8,751,984 B2 * | 6/2014 | Safarpour | G06F 17/5045 716/106 |
| 8,910,099 B1 | 12/2014 | Goyal et al. | |
| 8,990,746 B1 | 3/2015 | Goyal et al. | |
| 9,021,409 B2 * | 4/2015 | Vasudevan | G06F 17/504 716/106 |
| 9,372,949 B1 | 6/2016 | Hanna et al. | |
| 9,563,727 B2 * | 2/2017 | Darbari | G01R 31/31727 |

(Continued)

Primary Examiner — Naum B Levin
(74) Attorney, Agent, or Firm — Vista IP Law Group, LLP

(57) ABSTRACT

Disclosed are methods, systems, and articles of manufacture for implementing deadlock detection with formal verification techniques in an electronic design. These techniques identify one or more inputs that include at least an initial state of an electronic design and identify at least one deadlock candidate by sweeping at least a portion of a state space of the electronic design with formal verification techniques. These techniques then determine whether the at least one deadlock candidate is a real deadlock by using a second formal search with the formal verification techniques.

20 Claims, 24 Drawing Sheets

(56) References Cited

U.S. PATENT DOCUMENTS

| | | | |
|---|---|---|---|
| 9,633,153 B1 * | 4/2017 | Khaikin | G06F 17/5045 |
| 9,734,278 B1 | 8/2017 | Purri et al. | |
| 9,767,236 B2 * | 9/2017 | Darbari | G06F 17/5022 |
| 9,922,209 B1 | 3/2018 | Purri et al. | |
| 2008/0092147 A1 * | 4/2008 | Kersten | G06F 9/524 |
| | | | 719/316 |
| 2008/0127009 A1 * | 5/2008 | Veneris | G06F 11/3608 |
| | | | 716/103 |
| 2009/0132991 A1 * | 5/2009 | Ganai | G06F 17/504 |
| | | | 716/104 |
| 2015/0278416 A1 * | 10/2015 | Darbari | G01R 31/31727 |
| | | | 716/108 |
| 2017/0364609 A1 * | 12/2017 | Darbari | G06F 17/504 |

* cited by examiner

402

% check_deadlock buffer_full 1'b1 50

| Type | Name | Engine | Bound |
|------|------|--------|-------|
| Cover | cov_stuck | ? | 1 |

% check_deadlock buffer_full 1'b1 50
Generated property 'cov_stuck' with expression 'buffer_full == 1'b1 [*50]

| Type | Name | Engine | Bound |
|---|---|---|---|
| Cover | cov_stuck | U | 72 |
| Cover | cov_exit | ? | 1 - |

% check_deadlock buffer_full 1'b1 50
Generated property 'cov_stuck' with expression 'buffer_full == 1'b1 [*50]
Proving property 'cov_stuck' using engines H, U, N, L and time limit of 3600s.
EngineU: The cover property "cov_stuck" was covered in 72 cycles in 61.40s.
Generated property 'cov_exit' with expression 'buffer_full !=1'b1'.

| Type | Name | Engine | Bound |
|---|---|---|---|
| Cover | cov_stuck | U | 72 |
| Cover | cov_exit | ? | 72 - |

...
EngineU: The cover property "cov_stuck" was covered in 72 cycles in 61.40s.
Generated property 'cov_exit' with expression 'buffer_full !=1'b1'.
Proving property 'cov_exit' from 'cov_stuck' using engines H, T, N and time
limit of 3600s . . .

| | Type | Name | Engine | Bound |
|---|---|---|---|---|
| ✓ | Cover | cov_stuck | U | 72 |
| ✗ | Cover | cov_exit | N | 72 |

. . .
EngineN: The cover property 'cov_exit' was proven unreachable from 'cov_stuck' in 128.09s.
Found real deadlock: signal 'buffer_full' can get stuck on value '1'b1' forever.

FIG. 4S

METHODS, SYSTEMS, AND COMPUTER PROGRAM PRODUCT FOR IMPLEMENTING DEADLOCK DETECTION WITH FORMAL VERIFICATION TECHNIQUES IN AN ELECTRONIC DESIGN

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Highly-integrated complex system-on-chip (SoC) devices power a wide range of systems, ranging from mobile computing devices to automotive control systems. One factor aiding the advancement and proliferation of these complex devices includes the use of readily available reusable semiconductor intellectual property (IP). Reusable semiconductor IP provides designers with a variety of silicon proven subsystem blocks, including processors, memory controllers, physical interfaces (PHYs), and input/output (I/O) circuits. But the integration of reusable semiconductor IP also adds to the growing challenges facing design verification engineers.

Multisystem SoCs present complex system issues that can be difficult and time consuming to identify and solve, even for experienced design verification engineers. These issues include verifying that multiple subsystems operate as a system and stressing subsystem interfaces to fully characterize and verify transaction flow between subsystem modules. While verification tools have improved, current verification methods still require significant expertise and experience to quickly identify and debug complex interface and interconnect problems. In many cases, verification tools lack the capability to interact with verification engineers in a manner to leverage their expertise to address this complexity. The presence of deadlocks where an electronic design remains at a particular state for an extended period of time presents further challenges to verification tools.

Conventional deadlock detection approaches using formal verification techniques are typically done with liveness assertions that check whether the design will transition out of a particular state. For example, a liveness assertion might be written to check that whenever a state machine is on state BUSY, it will eventually transition out of BUSY in the future. Liveness assertions will either follow LTL or CTL semantics. LTL liveness assertions will check that the design always transitions to a certain state. CTL liveness assertions will check that the design can always transition to a certain state. This difference is important because it impacts how the environment has to be constrained in order to catch real deadlock issues.

Some conventional approaches use simulations to detect deadlocks. Given a certain stimulus, the simulation testbench checks whether the design is back to an idle state at the end of the simulation. If it is not, then the design deadlocked along the test. Because the stimulus is provided by the user, micro-architectural analysis usually takes place before investing in the simulation testbench, to try to predict where and how deadlocks may happen, so the stimulus can focus on these areas.

Furthermore, the analysis of liveness assertions by modern model checkers is a computationally-intensive task and does not scale well with design sizes nowadays. Hence, this conventional approach is often limited to small electronic designs. When using LTL liveness assertions—the most common approach—another issue is that they require fairness constraints in order to avoid false negatives. The fairness constraints guarantee that design inputs will have the necessary activity which will prevent the design from deadlocking. For example, to prove that a state machine always eventually transitions out of state BUSY, it might be required to add a fairness constraint saying that that state machine will eventually get a response from another block.

Specification and/or verification of CTL liveness assertions may not be supported by most model checkers. In some cases where model checkers support specification and/or verification of CTL liveness assertions, one of the main challenges is then the fact that the semantics of CTL assertions are very hard to explain to users without extensive formal verification background, and thus making it unusable to most. Finally, bugs caught by CTL liveness assertions have to show that there is a case where the design cannot return to a certain state, which usually cannot be easily captured in a waveform. When using simulation techniques, the effectiveness of simulation depends on how the user set up the stimulus. In particular with deadlock detection, trying to predict areas where deadlocks may occur may be extremely challenging and error prone, as often these issues occur where it was not expected. Moreover, it has been observed that the stimulus that causes a deadlock may have very strict timing requirements, rendering it hard for users to reproduce a deadlock in simulation even when the area where it occurs is known a priori.

Thus, what are needed are methods, systems, and computer program products for deadlock verification of electronic designs using formal techniques to improve deadlock detection while reducing computational intensity and to address at least the aforementioned issues and shortcomings.

SUMMARY

Disclosed are method(s), system(s), and article(s) of manufacture for implementing deadlock detection with formal verification techniques in an electronic design in one or more embodiments. Some embodiments are directed at a method for implementing deadlock detection with formal verification techniques in an electronic design.

In some embodiments, these techniques identify one or more inputs that include at least an initial state of an electronic design and identify at least one deadlock candidate by sweeping at least a portion of a state space of the electronic design with formal verification techniques. These techniques then determine whether the at least one deadlock candidate is a real deadlock by using a second formal search with the formal verification techniques.

In some of these embodiments, the initial state of the electronic design may be identified; one or more user specified constraints may be identified for the electronic design; one or more state space sweeping thresholds may be identified for the formal verification techniques; or one or more deadlock criteria may be identified for identifying the one or more inputs.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which:

FIGS. 4M-4S illustrate some example screen shots of a user interface coupled to the deadlock detection engine and a plurality of formal engines in some embodiments.

DETAILED DESCRIPTION

Figure 1:
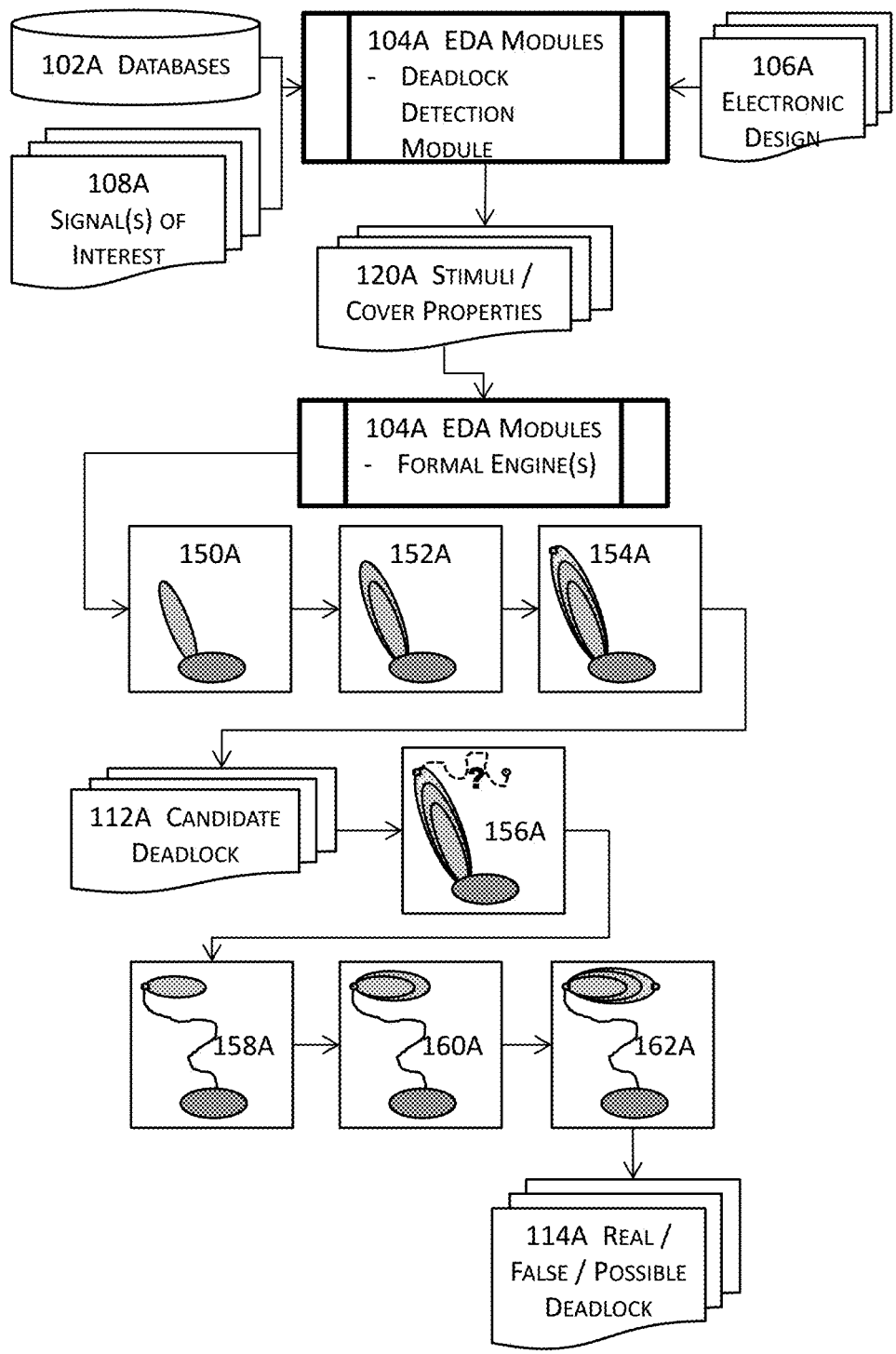
FIG. 1 illustrates a high level block diagram of a simplified system for implementing deadlock detection with formal verification techniques in an electronic design in one or more embodiments.

Various techniques are directed to implementing deadlock detection with formal verification techniques in an electronic design in various embodiments. Some techniques described herein employ a two-step approach to detect deadlocks in hardware designs using formal technology. These techniques first use formal verification techniques to initiate a first search that sweeps the state space to identify scenarios where an electronic design remains in a single state (e.g., a stuck state) for a predetermined number of clock cycles.

These scenarios are considered deadlock candidates, but not all deadlock candidates are necessarily real deadlocks. For example, an electronic design may remain in a state for some extended number of clock cycles because a portion of the electronic design is expecting inputs from, for example, an external interface, yet the inputs have not been provided as one or more stimuli. In this example, the electronic design is not in a real deadlock; rather, the extended number of clock cycles during which the electronic design remains in the same state is caused by the unavailability of the inputs in the stimuli.

Once one or more deadlock candidates are identified, the first search is may be terminated, and a second search is initiated from the state represented by a deadlock candidate to determine whether the formal verification techniques find a stimulus that enables the electronic design to exit that deadlock candidate state. If the verification engine calculates the stimuli by sweeping the state space within the predetermined number of clock cycles, and none of the stimuli enable the electronic design to exit the deadlock candidate state, then a real deadlock has been identified. Alternatively, a deadlock candidate may be confirmed as a real deadlock if the verification engine determines that it is impossible for the electronic design to exit the deadlock candidate state, which corresponds to being stuck on this state indefinitely, for infinite cycles. This real deadlock and optionally some pertinent information (e.g., the stimulus that causes the deadlock candidate, the clock cycle information, etc.) may be reported for review and fixing. On the other hand, if the verification engine, while sweeping the state space, calculates a stimulus that enables the electronic design to exit the deadlock candidate state, the deadlock candidate is determined to be a false deadlock.

In some embodiments, these techniques described herein do not seek to guarantee, prove, or disprove that an electronic design is deadlock-free. In these embodiments, these techniques seek to find deadlock bugs by splitting the deadlock detection into a two-phase approach each with its designated formal task as briefly described above. These techniques allow for better performance and higher accuracy in deadlock detection than conventional approaches employing simulation or emulation techniques, while conserving computational resources.

One of the advantages of these techniques described herein is that these techniques no longer need any LTL (linear temporal logic) liveness assertions or fairness constraints to detect deadlocks. A derived advantage is that the amount of data to store and process and the runtime to process such data and to detect deadlocks are greatly reduced. As is well known in the field, an infinite waveform is theoretically required for a liveness assertion to fail (e.g., remaining in one state infinitely). These techniques described herein do not require any LTL liveness assertions to detect deadlocks and thus conserve the storage space and processing time for and associated with such waveforms.

In addition, these techniques require no fairness constraints and thus provide a more accurate and efficient way to detect deadlocks while conserving more computational resources. A fairness constraint is often paired with a liveness assertion so that when the liveness assertion is used to detect a deadlock, the fairness constraint guarantees that the formal verification engine will ignore cases that are not real deadlocks. For example, a fairness constraint may be used with a liveness assertion so that a formal verification engine ignores cases where the electronic design under test is stuck because it is waiting for an external input stimulus. Liveness assertions without corresponding fairness constraints often fail for its conservatism because the fact that there is a way for an electronic design to be stuck does not necessarily mean there is a deadlock. For example, a finite state machine may be shown to be busy for an extended period of time, causing the liveness assertion to fail. Nonetheless, the finite state machine may be shown busy simply because the requisite response did not come on an external interface, and this is not a real deadlock. To avoid this false deadlock, a fairness constraint is needed to guarantee that responses will come on the external interface with an appropriate latency. Such fairness constraints are not required when implementing the deadlock detection method described herein. Without requiring LTL liveness assertions or fairness constraints, these techniques eliminate at least some or even all of the false deadlocks and thus provide a more accurate and efficient way to detect deadlocks while conserving more computational resources.

Another advantage of these techniques described herein is that these techniques employ formal verification techniques, instead of simulation or emulation techniques. More precisely, these techniques employ formal verification techniques that sweep the entire state space (e.g., for one or more clock cycles) and calculate the stimuli automatically and rigorously to determine whether a deadlock is detected. In contrast, simulation techniques receive user specified or provided stimuli or inputs and thus can only hit the state space randomly or according to the user specified or provided stimuli or inputs.

In addition, simulation techniques are known to search for targets (e.g., deadlocks) in a depth first manner and thus may waste much more computational resources when the user specified or provided stimuli or inputs do not guide the simulator in the correct direction. In contrast, formal techniques with rigorous mathematical proofs search for their targets in a breadth first manner and thus cover much broader, if not the entire, state space and thus eliminate or at least greatly reduce the possibility of any false negatives (e.g., no deadlocks).

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

FIG. 1 illustrates a high level block diagram of a simplified system for implementing deadlock detection with formal verification techniques in an electronic design in one or more embodiments. In these embodiments, one or more EDA (electronic design automation) modules 104A (e.g., one or more formal engines) may be coupled with one or more databases 102A and a repository storing thereupon, for example, cover properties, assertions, etc.

In operation, the one or more EDA modules 104A may initiate a first search that exhaustively or non-exhaustively sweep the state space of an electronic design and calculate stimuli, cover properties, and/or assertions 120A that are used to verify the electronic design 106A. These one or more EDA modules 104A may then apply the stimuli to the electronic design to determine whether the electronic design remains in one state for some extended number of clock cycles. For example, one or more formal engines in 104A may initiate a first search and sweep the state space to repeatedly generate and apply clock cycle-based stimuli (e.g., input vectors) to the electronic design and examine the behaviors (150A, 152A, 154A) of the electronic design on a clock cycle by clock cycle basis to determine whether the electronic design remains in one state for an extended number of clock cycles. If the one or more formal engines in 104A determine that the electronic design remains at the same state (e.g., a deadlock candidate state or a stuck state) for some extended number of clock cycles in 154A, a deadlock candidate 112A is identified.

It shall be noted that various techniques may be used by the one or more formal engines to identify deadlock candidates during the first search. These various techniques may include, for example, formal verification techniques that exhaustively sweep pertinent state space, formal verification techniques that non-exhaustively sweep pertinent state space, simulations, emulations, etc. although formal verification techniques may provide better coverage of the pertinent state space. The technique for the first search may thus be determined based in part or in whole upon one or more factors including, for example, the completeness of coverage of the state space, the desire or requirement to guarantee the identification of all deadlocks, available computational resources, a balance of two or more of the aforementioned factors, or any other pertinent facts.

The one or more formal engines may then terminate the first search and initiate a second search with formal verification techniques from the deadlock candidate state or the stuck state of the electronic design. In some embodiments, the second search exhaustively explores the state space and calculates the stimuli that are applied to the electronic design to determine whether the electronic design may exit the deadlock candidate state or the stuck state (156A). In some other embodiments, the second search may employ some non-exhaustively techniques (e.g., non-exhaustive formal verification techniques, simulation techniques, emulation techniques, etc.) to determine whether the electronic design may exit the deadlock candidate state or the stuck state as shown in 156A. In some embodiments, a resource threshold limit may be imposed on the second search. For example, the second search may be limited to sweep the pertinent state space for a predetermined amount of time before terminating. In these embodiments where the electronic design fail to successfully exit the deadlock candidate state before the threshold limit is reached, the deadlock candidate may be considered as a possible deadlock because the second search stops because the threshold limit has been reached, not necessarily because the electronic design cannot exit the deadlock candidate state.

If the electronic design cannot exit the deadlock candidate state or the stuck state, the deadlock candidate is determined to be a real deadlock which may then be reported for further review and fixing. On the other hand, if the electronic design does successfully exit the deadlock candidate state or the stuck state, the deadlock candidate is determined to be a false deadlock and may thus be discarded from further consideration or analyses. For example, if the one or more formal engines in 104A sweeps the state space, calculates multiple sets of clock cycle-based stimuli, applies these multiple sets of clock cycle-based stimuli to the electronic design (e.g., 158A and 160A), and determines that the electronic design may exit the deadlock candidate state or the stuck state (162A), this deadlock candidate is determined to be a false deadlock 114A. On the other hand, if the one or more formal engines 104A determines that the electronic design cannot exit the deadlock candidate state, this deadlock candidate may be determined to be a real deadlock 114A. In addition, if the one or more formal engines 104A reach a predetermined resource threshold limit before finding a stimulus for the electronic design to exit the deadlock candidate state, this deadlock candidate may be considered a possible deadlock 114A.

The one or more EDA modules 104A may also receive one or more signals of interest 108A such as control signals of the electronic design, buffer empty signals, buffer full signals, state machine signals, etc. The deadlock detection module in 104A may then convert the one or more signals of interest into one or more corresponding cover properties, one or more assertions, or a combination thereof. These one or more cover properties or assertions may then be forwarded to one or more verification engines in 104A that employ an identical or a substantially similar approach as described herein to determine whether these one or more cover properties may be satisfied or whether the opposites may be found for these one or more assertions in the electronic design.

For example, a buffer full signal may constitute a signal of interest because a buffer remaining full for an extended number of clock cycles more likely indicate an error in the underlying electronic design. One or more formal engines may thus automatically identify a buffer full signal from the electronic design. The deadlock detection module in 104A may then convert this buffer full signal into, for example, a cover property as follows:

cov_stuck: cover property (buffer_full==1[*100])

With the aforementioned cover property converted from the identified buffer full signal, the one or more formal engines may utilize the techniques described herein to determine whether the buffer remains full for 100 clock cycles during the first search described above. If so, a deadlock candidate is identified, and the first search may be terminated while a second search will be initiated to determine whether the electronic design may successfully exit that stuck state with the techniques described herein. If the electronic design does successfully exit the stuck state, this deadlock candidate is considered a false deadlock. On the other hand, if the electronic design fails to exit the stuck state after the one or more formal engines exhaustively sweep the pertinent state space, this deadlock candidate is considered as a real deadlock that will be further reviewed and analyzed. In addition, if the electronic design fails to exit the stuck state before a threshold limit on the search is reached, this deadlock candidate is considered as a possible deadlock that may be further reviewed or analyzed.

Figure 2:
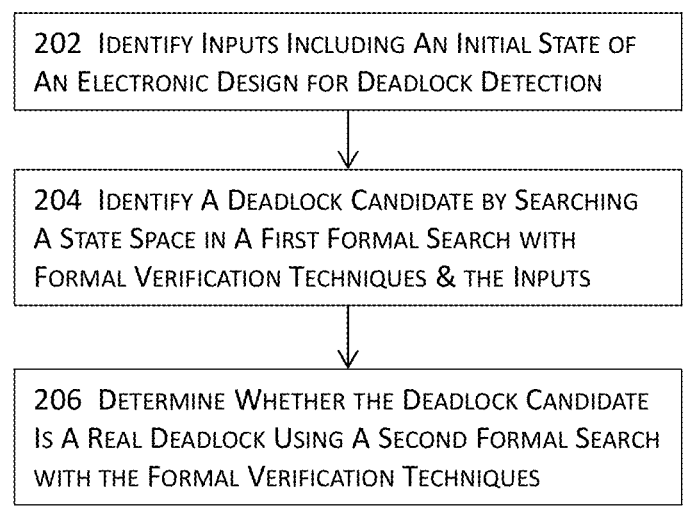
FIG. 2 illustrates a high level block diagram for implementing deadlock detection with formal verification techniques in an electronic design in one or more embodiments.

FIG. 2 illustrates a high level block diagram for implementing deadlock detection with formal verification techniques in an electronic design in one or more embodiments. In these embodiments, one or more inputs that include an initial state of an electronic design may be identified at 202 for deadlock detection. An initial state of an electronic design may include, for example, a reset state, a standby state, or any state with predefined values, etc.

One or more deadlock candidates may be identified at 204 by searching a state space of the electronic design in a first formal search with formal verification techniques and the one or more inputs identified at 202. For example, a formal engine may initiate a first search and sweeps the state space of the electronic design to calculate one or more stimuli, apply the one or more stimuli to the electronic design, and determine whether the electronic design remains in a deadlock candidate state or a stuck state for some extended number of clock cycles. If so, the state in which the electronic design remains may be determined to be a deadlock candidate.

As a practical working example, a formal engine may use a cover property to determine whether an electronic design may remain in a particular state for a predetermined number of cycles. Such a cover property may be specified as follows:

cov_stuck: cover property (fsm==BUSY [*100])

The aforementioned cover property is set forth to determine whether the electronic design under test may remain in a particular state for 100 clock cycles. Also, the term "fsm" in the above property denotes "finite state machine" for the electronic design under test. The formal engine then sweeps the state space from, for example, the initial state to determine whether the aforementioned cover property may be satisfied by a stimulus for an i-th clock cycle calculated by the formal engine. The formal engine may calculate and apply the stimuli on a clock cycle by clock cycle basis until the identification of a deadlock candidate or a threshold limit on the first search being reached, whichever occurs first.

One of the advantages of these deadlock detection techniques described herein is that these techniques sweep the state space to calculate stimuli that are then provided to the electronic design to identify possible deadlocks (deadlock candidates), whereas conventional approaches employing simulation or emulation techniques rely on user provided inputs or stimuli and thus may not find any deadlocks unless the user provided inputs or stimuli happen to result in deadlocks. In other words, these techniques described herein sweep the state space to calculate stimuli that are applied to an electronic design for deadlock detection, instead of randomly walking the state space as conventional approaches employing simulation or emulation techniques do.

Once one or more deadlock candidates are identified at 204, the first search may be terminated, and a second search with the formal verification techniques may be initiated from the deadlock candidate state or stuck state to determine whether the electronic design may exit this particular or the stuck state at 206. More precisely, one or more formal engines may calculate one or more sets of stimuli by sweeping the state space from the deadlock candidate state or the stuck state. These one or more sets of stimuli may then be applied to the electronic design on a clock cycle by clock cycle basis to determine whether the electronic design may exit the deadlock candidate state or a stuck state. If the electronic design may exit the deadlock candidate state or the stuck state, the deadlock candidate is not a real deadlock.

On the other hand, if electronic design cannot exit the deadlock candidate state or the stuck state, the deadlock candidate may be considered a real deadlock.

With the aforementioned example of using a cover property to identify deadlock candidates, the formal engine may initiate the second search to sweep the state space to determine whether the following cover property may be satisfied:

cov_exit: cover property (fsm !=BUSY)

The aforementioned cover property tests whether the finite state machine of the electronic design under test may exit the deadlock candidate state or the stuck state. Similar to the first search with formal verification techniques, the formal engine may sweep the state space (e.g., by assigning possible values to registers, by enumerating one or more ranges of possible values of a combination logic, etc.) on a clock cycle by clock cycle basis to determine whether the above cover property may be satisfied.

If the formal engine determines that the cov_exit cover property may be satisfied, the electronic design may successfully exit the deadlock candidate state or stuck state, and the deadlock candidate is then determined not to be a real deadlock. In some embodiments, this deadlock candidate may be discarded from further consideration or analyses. In some other embodiments, this deadlock candidate may be stored for further review despite its status as a false deadlock.

On the other hand, if the formal engine formally proves that it is impossible for the electronic design to exit the deadlock candidate state, then deadlock candidate may be determined and categorized to be a real deadlock that may be further reported to the user for review of the real deadlock and modification of the underlying electronic design. Optionally, the second search may be limited to only process a predetermined number of clock cycles before considering a deadlock candidate a real deadlock. This may reduce the computational resources required to confirm a deadlock, but with the tradeoff of potentially incorrectly classifying false deadlocks as real ones.

It is also possible for the formal engine to reach a predetermined resource (time, memory, etc.) threshold before finding an input stimuli that causes the electronic design to exit the deadlock candidate state and before formally proving that it is impossible for it to exit the deadlock candidate state. In this case, the deadlock candidate is categorized as a potential deadlock.

It shall be noted that in formal verification, a cover property is similar to an assertion in syntax but is treated in exactly the opposite manner by a formal engine. For example, given an assertion "assert (a && b)", a formal engine is to sweep the state space of an electronic design under test to determine whether the opposite of the assertion (e.g., !a||!b) can be found. In contrast, given a cover property "cover (x !=y)", the formal engine is to sweep the state space to determine whether the cover property (x !=y) can be found. Therefore, the use of the cover property specified above is merely for demonstration and ease of explanation, and assertions may also be used in some embodiments to achieve full and equal effects. It shall be further noted that although one of the goals of the second search with formal verification techniques is to determine whether deadlock candidates are real deadlocks. The second search may also incorporate the deadlock candidate detection (e.g., by using the cover property cov_stuck: cover property (fsm==BUSY [*100]) described above) to determine whether one or more additional deadlock candidates are identified during the second search in some embodiments.

Figure 3A:
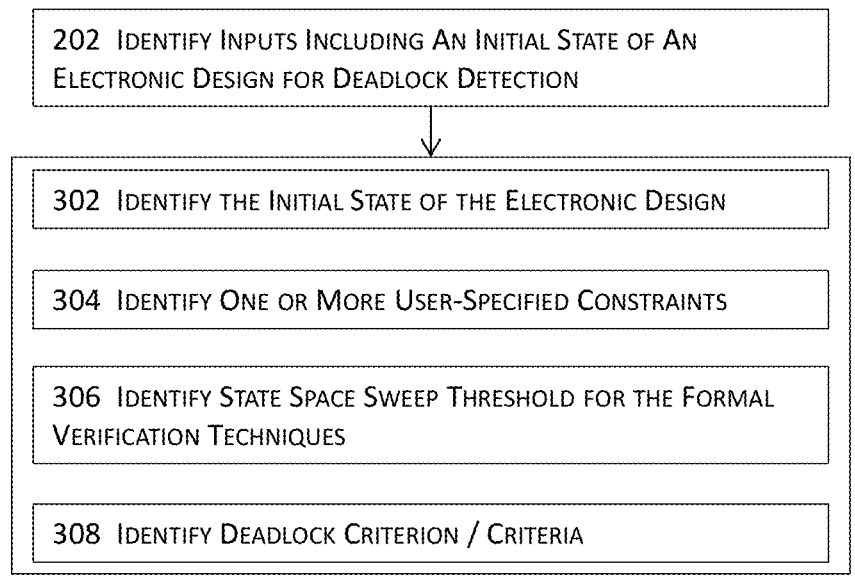
FIG. 3A illustrates a more detailed block diagram for a sub-process of implementing deadlock detection with formal verification techniques in an electronic design illustrated in FIG. 2 in one or more embodiments.

FIG. 3A illustrates a more detailed block diagram for a sub-process of implementing deadlock detection with formal verification techniques in an electronic design illustrated in FIG. 2 in one or more embodiments. More specifically, FIG. 3A illustrates more details about identifying one or more inputs at 202 in FIG. 2 in one or more embodiments. These one or more inputs to one or more formal engines may include, for example, an initial state of the electronic design (302). The initial state of the electronic design may include, for example, the reset state, a standby state, or any state with predefined values, etc.

These one or more inputs may also optionally include one or more user-specified constraints (304) for one or more formal engines to consider while searching for deadlocks. For example, a user may specify that the electronic design remains in a specific mode during verification. The stimuli calculated by the formal engines may only consider the cases where this constraint is respected, resulting in verifying the electronic design only in the selected mode.

These one or more inputs identified at 202 may also include a state space sweep threshold (306) that imposes a limit on, for example, the number of iterations, amount of memory utilization, and/or amount of time spent that these formal verification techniques may take to calculate and apply stimuli for the electronic design for deadlock detection. In addition or in the alternative, these one or more inputs may include one or more criteria (308) for determining whether an electronic design is in a deadlock. For example, a predetermined number of clock cycles (e.g., 100 clock cycles in the aforementioned cover property example) in which an electronic design under test remains in a particular state may be imposed as a deadlock criterion. A deadlock criterion may also include a negative criterion where a deadlock is determined not to exist when the deadlock criterion is satisfied. For example, a criterion of waiting for inputs from an external interface may be imposed as such a negative deadlock criterion so that is a portion of an electronic design is determined not to be in deadlock when the portion remains in a particular state for an extended number of clock cycles merely because the portion of the electronic design is waiting for inputs from an external interface.

Figure 3B:
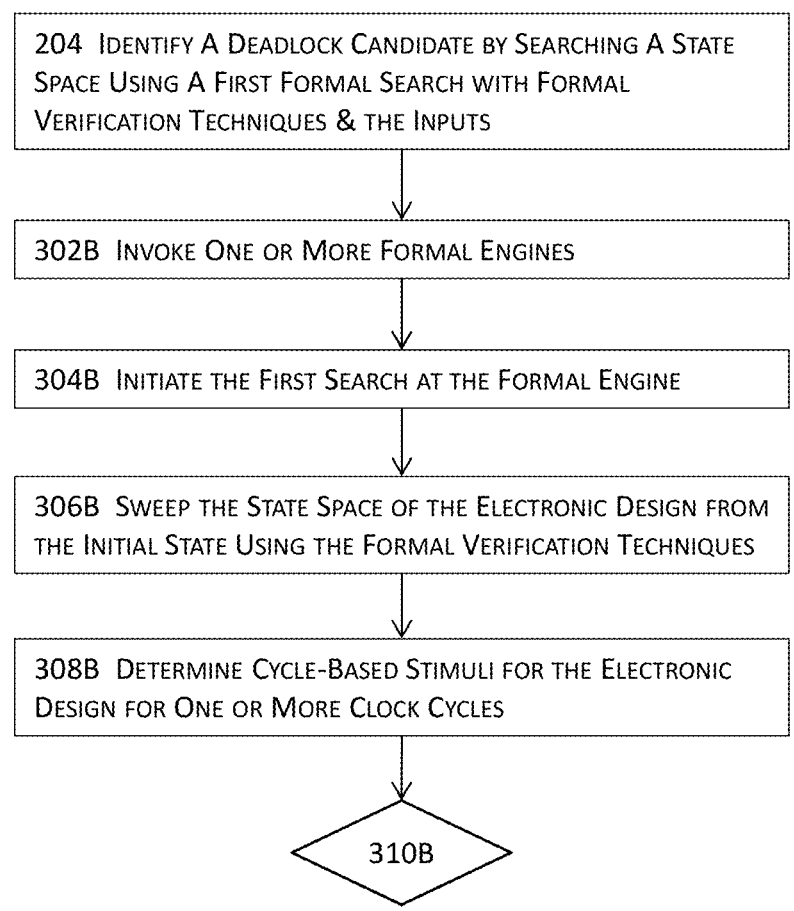
FIGS. 3B-3C jointly illustrate a more detailed block diagram for another sub-process of implementing deadlock detection with formal verification techniques in an electronic design illustrated in FIG. 2 in one or more embodiments.
Figure 3C:
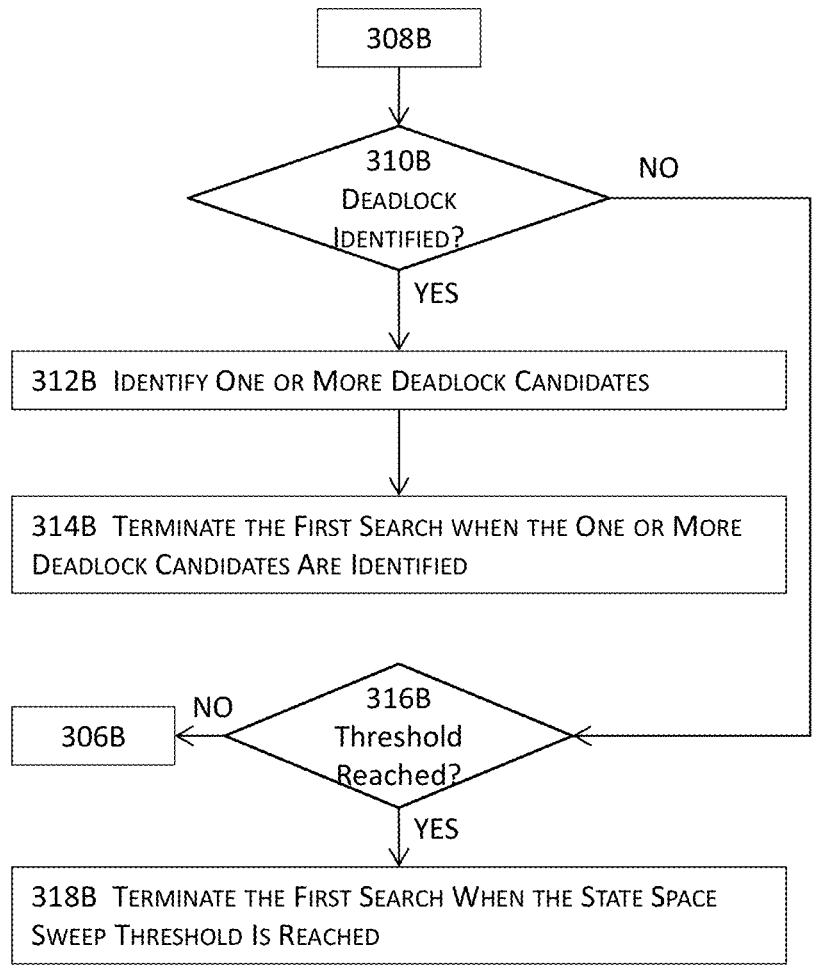

FIGS. 3B-3C jointly illustrate a more detailed block diagram for another sub-process of implementing deadlock detection with formal verification techniques in an electronic design illustrated in FIG. 2 in one or more embodiments. More specifically, FIGS. 3B-3C jointly illustrate more details about identifying a deadlock candidate at 202 in FIG. 2. In these embodiments, one or more formal engines may be invoked at 302B. It shall be noted that various aspects of the processes described herein may be performed in a parallel or distributed paradigm.

A first search using formal verification techniques may be invoked at 304B. The first search calculates one or more sets of stimuli that are then applied to the electronic design under test for deadlock detection. As described above with reference to 302B, one or more formal engines may be invoked at 302B. With regard to the first search, multiple formal engines may be initiated in a parallel or distributed paradigm to calculate stimuli by sweeping the state space of an electronic design under test for the first search in order to identify deadlock candidates.

The state space is swept at 306B from the initial state of the electronic design using formal verification techniques to calculate stimuli that are applied to the electronic design under test. Clock cycle-based stimuli for one or more clock cycles may then be determined by the one or more formal engines at 308B for the electronic design under test. In some embodiments, a formal engine calculates a set of stimuli for one clock cycle for the electronic design under test by sweeping the state space (e.g., from the initial state when the analysis first starts) and holds subsequent calculations of stimuli until the application of the set of stimuli results in no deadlock candidates (e.g., the electronic design proceeds to a next stable state for each of the set of stimuli during the clock cycle) in order to save computational resources in calculating the stimuli. In some other embodiments, a formal engine may calculate multiple sets of stimuli for multiple successive clock cycles at a time by successively sweeping the state space and apply each set of stimuli at a time. A determination may be made at 310B to determine whether a deadlock candidate has been identified. For example, a formal engine may determine that a deadlock candidate is identified at 310B when the electronic design under test remains in a particular state for a predetermined number of clock cycles (e.g., a deadlock criterion 308).

If the determination result at 310B is affirmative, a deadlock candidate is identified at 312B. The first search may be terminated at 314B upon the identification of one or more deadlock candidates in some embodiments. On the other hand, if the electronic design successfully transitions to the next stable state in response to the stimuli, the determination result at 310B is negative, and the process may process to 316B where another decision is made to determine whether the state space sweep threshold has been reached. If the state space sweep threshold has not been reached, the process may return to 306B to continue to sweep the state space of the electronic design and repeat the sub-processes 306B through 316B until the state space sweep threshold is reached or until deadlock candidates have been identified so that the first search with formal verification techniques is terminated at 318B.

In some embodiments where the state space sweep threshold has been reached, but no deadlock candidates have been found, the first search using formal verification techniques may also be terminated at 318B. In some other embodiments where no deadlock candidates have been identified at 310, and the state space sweep threshold has been reached, the state space sweep threshold may be increased, and the process may return to 306B to repeat the sub-processes 306B through 318B to further explore the state space to detect deadlock candidates.

Compared to conventional approaches employing techniques such as simulations or emulations, these techniques described herein using formal verification techniques to sweep the state space, subject to the state space sweep threshold, in order to calculate stimuli that are then applied to the electronic design as inputs. The behaviors of the electronic design in response to these stimuli are then examined to determine whether one or more deadlock candidates are identified based on whether the electronic design remains in a particular state for an extended number of clock cycles in response to the stimuli.

Conventional approaches employing simulation or emulation techniques receive inputs (e.g., input vectors) from the users and randomly walk the state space, rather than sweeping the state space, from the initial state. These conventional approaches then determines the behaviors of the electronic design in response to the received user inputs. If the user provided inputs coincidentally result in deadlocks, these conventional approaches may then identify such deadlocks. On the other hand, if the user provided inputs fail to cover the scenarios that may lead to deadlocks, these conventional approaches may thus fail to identify these deadlocks. Therefore, unlike conventional approaches that may randomly detect deadlocks, the two-step process described herein utilizing formal verification techniques provides a much more efficient and reliable approach to detect deadlocks.

As described above, various aspects of the process described herein may be performed in a parallel or distributed paradigm. For example, multiple deadlock candidates may be identified at 3106 during the application of a set of stimuli to an electronic design under test in a first search with formal verification techniques. These multiple deadlock candidates may be processed in parallel or distributed among multiple formal engines so that each formal engine initiates a separate search with formal verification techniques to verify whether the deadlock candidate is a real deadlock.

Figure 3D:
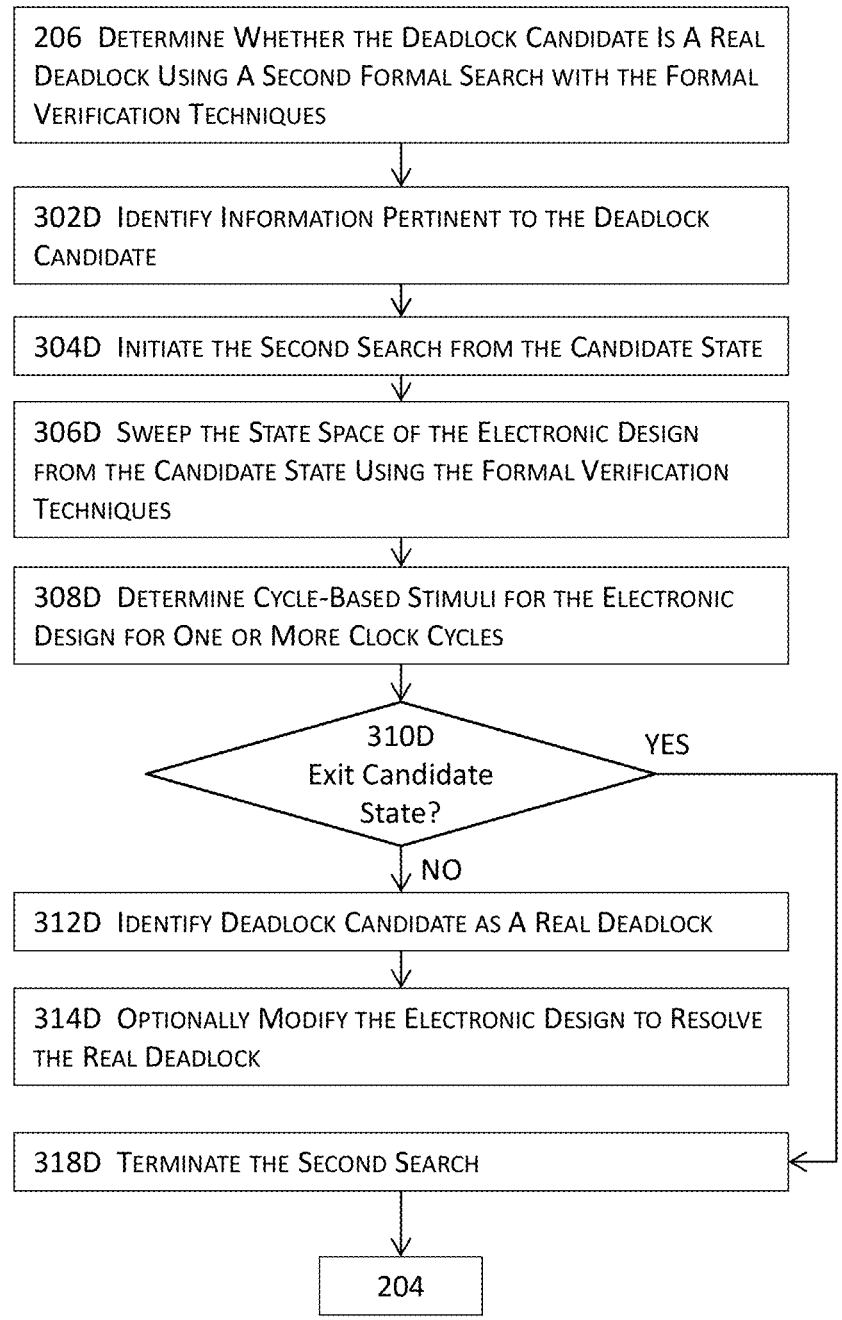
FIG. 3D illustrates a more detailed block diagram for another sub-process of implementing deadlock detection with formal verification techniques in an electronic design illustrated in FIG. 2 in one or more embodiments.

FIG. 3D illustrates a more detailed block diagram for another sub-process of implementing deadlock detection with formal verification techniques in an electronic design illustrated in FIG. 2 in one or more embodiments. More specifically, FIG. 3D illustrates more details about determining whether a deadlock candidate is a real deadlock (206) in FIG. 2. In these embodiments, information that is pertinent to a deadlock candidate may be identified at 302D. The information identified at 302D may include, for example, the information and/or values about the candidate state in which the electronic design remains for an extended number of clock cycles, information about the portion or devices whose state values remain for an extended number of clock cycles in the electronic design, the clock cycle(s) during which the electronic design remains for an extended number of clock cycles, the stimuli provided to the electronic design, or any other pertinent information that may be required or desired in confirming or resolving a deadlock, etc.

A second search using formal verification techniques may be initiated at 304D from the candidate state in which the electronic design remains for an extended number of clock cycles. It shall be noted that upon or after the identification of one or more deadlock candidates, the first search for deadlock candidates may be terminated or may continue to run in parallel with the second search. If the first search continues to run, more deadlock candidates may be found, which would be queued for processing by additional second searches running in parallel or in sequence. Therefore, the termination of the first search, and the initiation of the second search need not occur in a particular temporal sequence.

The state space from the candidate state of the electronic design under test may be swept at 306D using formal verification techniques. These formal verification techniques may then calculate one or more sets of clock cycle-based stimuli for one or more clock cycles at 308D. As described above, the formal verification techniques calculate a set of clock cycle-based stimuli for a clock cycle and postpone the calculation of the stimuli for the next clock cycles until the application and analysis of this set of stimuli are complete in some embodiments. In some other embodiments, multiple sets of stimuli may be calculated by the formal verification techniques for multiple clock cycles at once. Also as described above, the second search again leverage formal verification techniques to sweep the state space from a candidate state (e.g., a stuck state) in the determination of stimuli and thus provide more direct and reliable deadlock detection than conventional approaches employing simulation or emulation techniques that rely on user provided inputs.

A decision may be made at 310D to determine whether the electronic design may exit the candidate state. For example, the following cover property may be used to determine whether the electronic design may exit the candidate state.

cov_exit: cover property (fsm !=BUSY)

In the aforementioned cover property, the state of the finite state machine of the electronic design may be replaced with the candidate state corresponding to a deadlock candidate.

In some embodiments, this determination at 310D may be made based on a predetermined number of clock cycles that is received as an input. The larger the predetermined number of clock cycles is, the more likely that a deadlock candidate is a real deadlock if the electronic design fails to exit the candidate state within the predetermined number of clock cycles. On the other hand, a larger predetermined number of clock cycles requires more computational resources for stimuli calculation and application and for subsequent analyses. Therefore, a predetermined number of clock cycles may be determined based on heuristics or empirical formulae that strike a balance between confidence value in determined real deadlocks and the computational resource consumption. Similarly, the state space sweep threshold may also be similarly balanced against the computational resource consumption.

Other embodiments may also consider a deadlock candidate a real deadlock when the electronic design remains in the deadlock candidate state indefinitely. This would correspond to having the electronic design stuck in the candidate state for an infinite amount of clock cycles.

If the electronic design is determined not to exit the candidate state at 310D, the deadlock candidate may be identified as a real deadlock at 312D. This real deadlock may then be reported for further review or analyses. The electronic design may be optionally modified at 314D to resolve the real dead lock identified at 312D. If the electronic design is determined to successfully exit the candidate state at 310D, the second search may be terminated at 318D. Upon or shortly after termination of the second search, the process may return to 204 to continue to sweep the pertinent state space to determine whether one or more additional deadlock candidates are identified by using the techniques describe above with reference to 204. When the process returns to 204, the initial state of the electronic design used in 306B may continue to remain in the original initial state defined by the user in 304, or may be replaced with the exit state that was just reached in 310D.

Figure 4A:
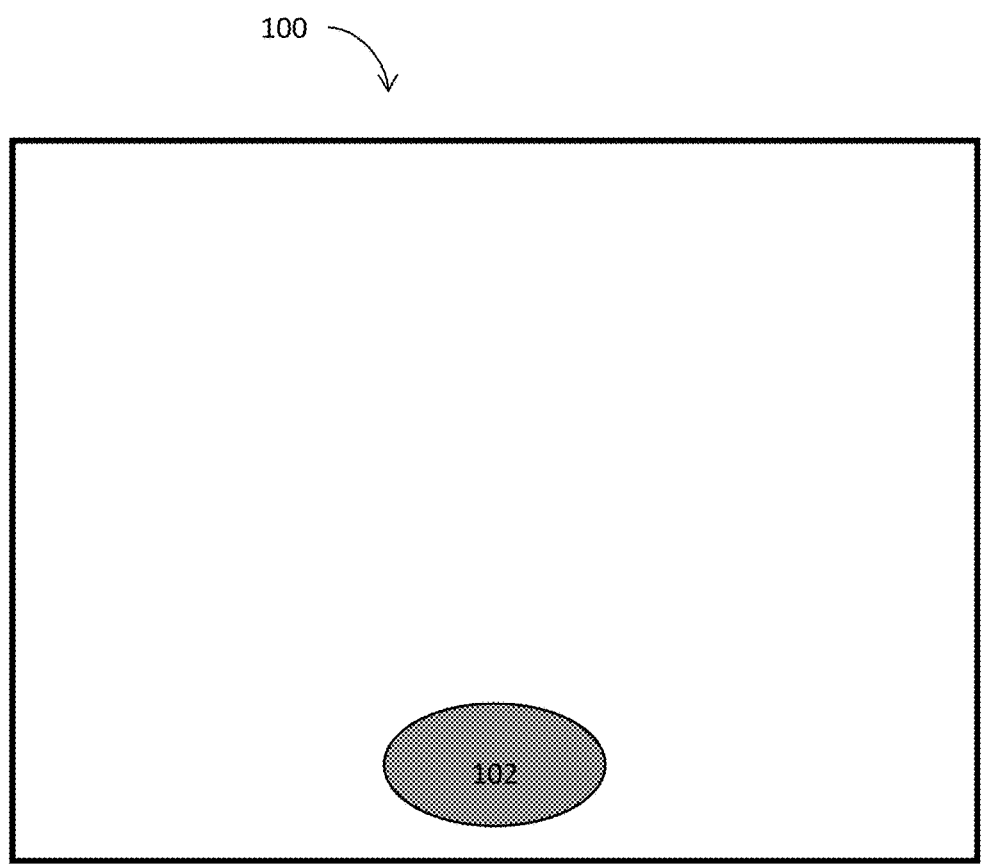
FIGS. 4A-4L illustrate an application of some of the techniques described herein to a portion of an example electronic design in one or more embodiments.
Figure 4B:
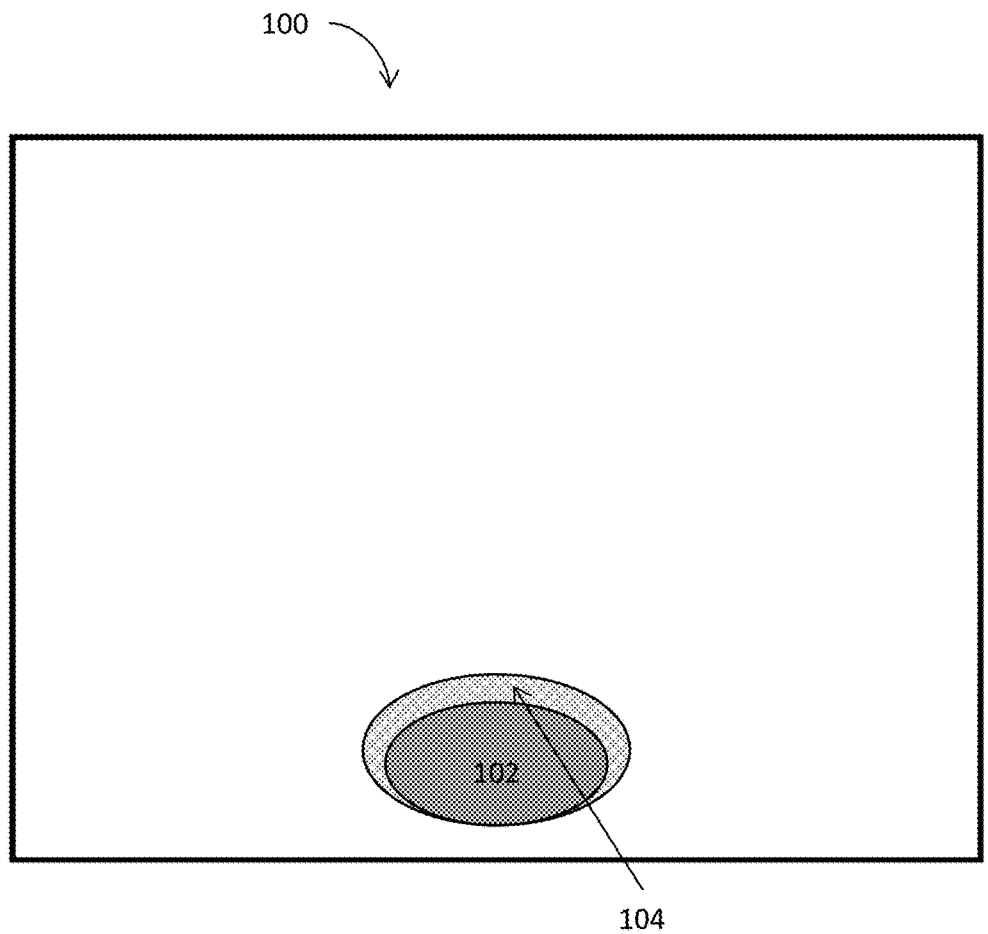

FIGS. 4A-4L illustrate an application of some of the techniques described herein to a portion of an example electronic design in one or more embodiments. In these examples, FIG. 4A illustrates the state space 100 in its entirety of an electronic design having an initial state of 102. FIG. 4B illustrates that one or more formal engines may initiate a first search from the initial state 102 of the electronic design and calculates a first set of stimuli for a first clock cycle from the initial state by sweeping the state space with respect to the first clock cycle.

The first set of stimuli is then applied to one or more pertinent portions of the electronic design (e.g., flops, registers, etc.), and the behaviors of the electronic design in response to the first set of stimuli are collected and examined to determine whether the electronic design remains in a particular state for an extended number of clock cycles. For example, the first set of stimuli may be applied to the electronic design to determine whether the aforementioned cover property (cov_stuck: cover property (fsm==BUSY [*100])) may be satisfied or an opposite of a corresponding assertion may be identified. Reference numeral 104 schematically indicates a portion of the state space that is swept by the one or more formal engines in calculating the first set of stimuli. Because the cover property (or the corresponding assertion) is not satisfied during the first clock cycle, the electronic design is determined not to exhibit any deadlock during this first clock cycle. These techniques described herein then proceed to the next clock cycle (the second clock cycle as illustrated in FIG. 4C).

Figure 4C:
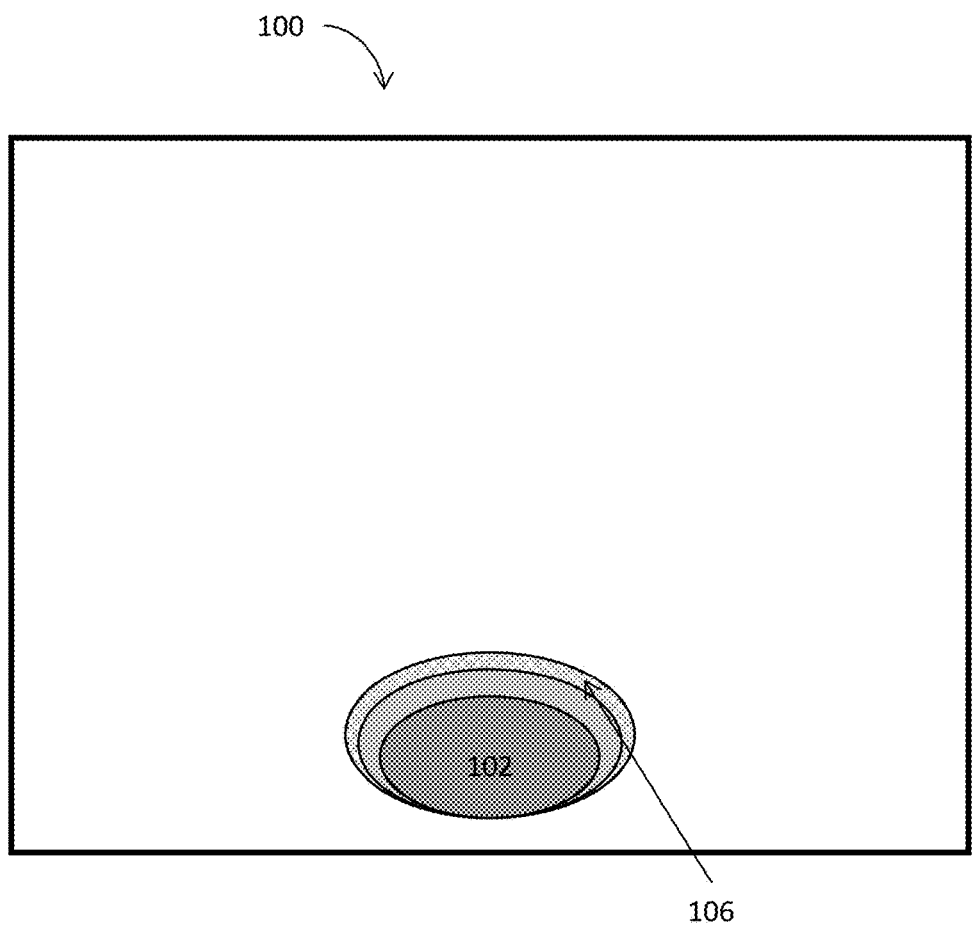

FIG. 4C illustrates that these one or more formal engines may continue with the first search from the state of the electronic design at the end of the first clock cycle (e.g., the first state) and calculates a second set of stimuli for a second clock cycle from the first state by sweeping the state space with respect to the second clock cycle. Similar to FIG. 4B, reference numeral 106 schematically indicates a portion of the state space that is swept by the one or more formal engines in calculating the second set of stimuli. Because the cover property (or the corresponding assertion) is still not satisfied during the second clock cycle, the electronic design is again determined not to exhibit any deadlock during this second clock cycle. These techniques described herein then proceed to the next clock cycle (the third clock cycle as illustrated in FIG. 4D).

Figure 4D:
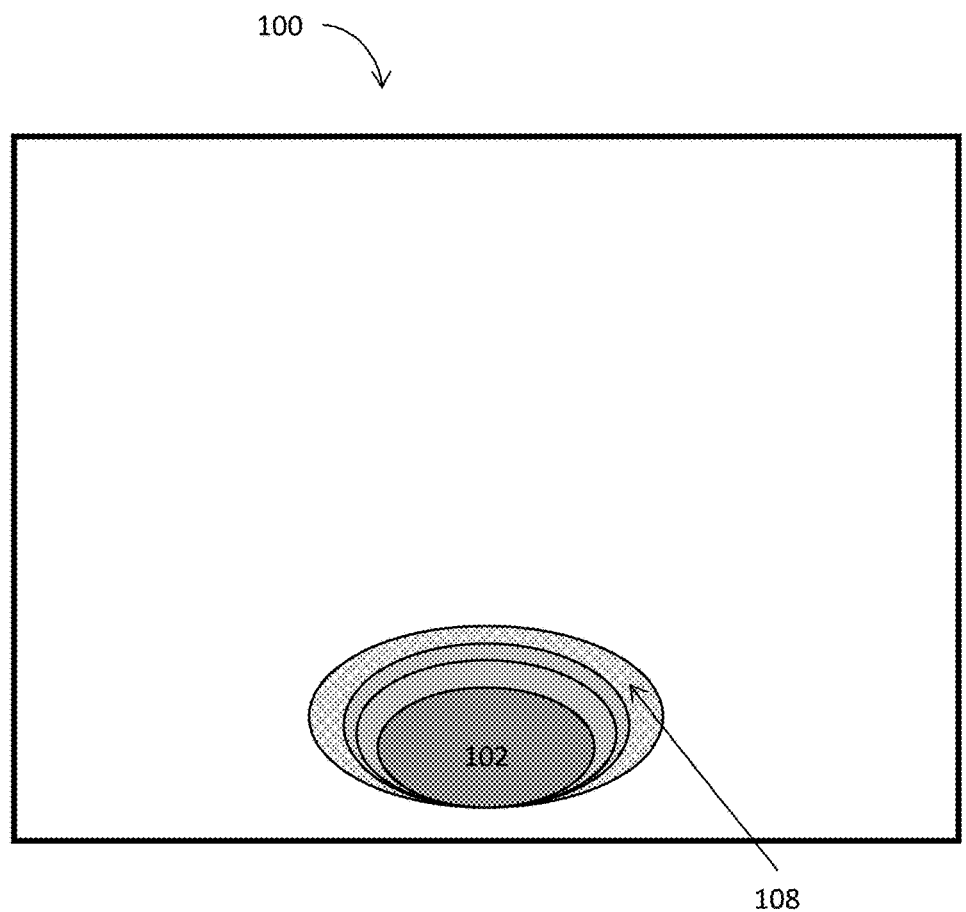

FIG. 4D illustrates that these one or more formal engines may further continue with the first search from the state of the electronic design at the end of the second clock cycle (e.g., the second state) and calculates a third set of stimuli for a third clock cycle from the second state by sweeping the state space with respect to the third clock cycle. Similar to FIGS. 4B-4C, reference numeral 108 schematically indicates a portion of the state space that is swept by the one or more formal engines in calculating the third set of stimuli. Because the cover property (or the corresponding assertion) is still not satisfied during the third clock cycle, the electronic design is again determined not to exhibit any deadlock during this third clock cycle. These techniques described herein then proceed to the next clock cycle (the fourth clock cycle as illustrated in FIG. 4E).

Figure 4E:
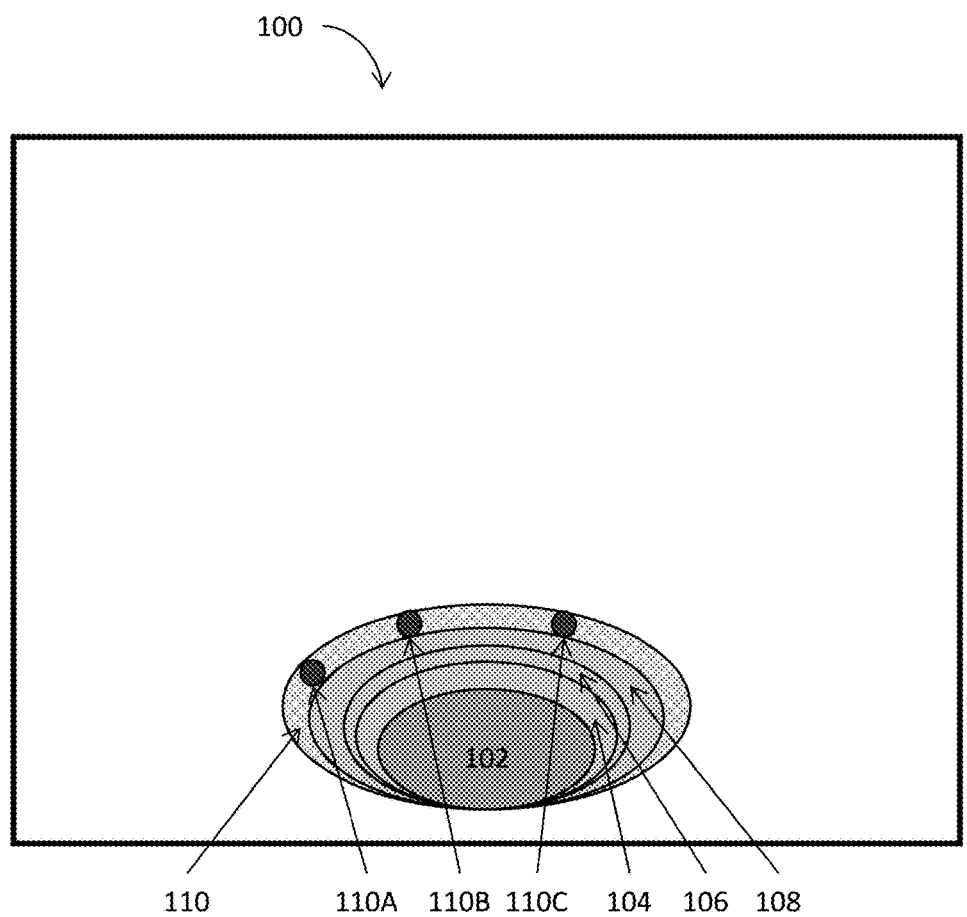

FIG. 4E illustrates that these one or more formal engines may further continue with the first search from the state of the electronic design at the end of the third clock cycle (e.g., the third state) and calculates a fourth set of stimuli for a fourth clock cycle from the third state by sweeping the state space represented by 110 with respect to the fourth clock cycle. In this example illustrated in FIG. 4E, these one or more formal engines determine that the aforementioned cover property is satisfied in three occurrences, 110A, 110B, and 110C, during the fourth clock cycle. As described above with reference to FIGS. 2 and 3A-3D, the first search by the one or more formal engines with formal verification techniques may be terminated upon or after the identification of these three occurrences 110A, 110B, and 110C. These three occurrences 110A, 110B, and 110C may be identified as deadlock candidates. These techniques then proceed to the second step to determine whether these deadlock candidates are real deadlocks.

In addition to deadlock candidates described above or in the alternative, one or more of the three occurrences 110A, 110B, and 110C may be a cover property (or an assertion) that is automatically generated in response to an input of one or more signals of interest, one or more interesting events, etc. For example, 110A may represent that a formal engine determines that a cover property converted from a buffer full signal is found in the electronic design. In this example, the first search may be terminated, and a second search may be initiated from this state for the formal engine to determine whether this buffer full signal successfully exits the buffer full state. Signals of interests and conversions of such signals into cover properties are described in greater details with reference to FIG. 1 above.

Figure 4F:
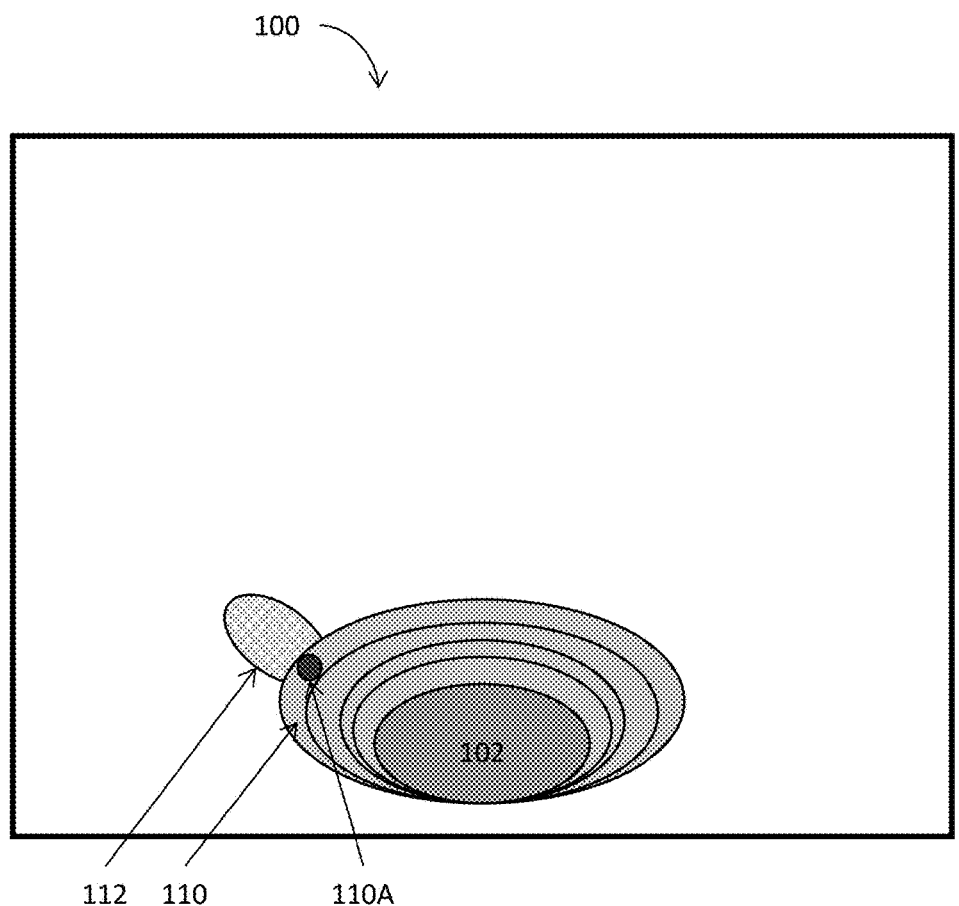

In the example illustrated in FIG. 4F, the one or more formal engines may initiate a second search that also utilize the formal verification techniques to sweep the pertinent state space 112 from the state corresponding to a deadlock candidate (e.g., 110A in FIG. 4F) identified during the first step illustrated in FIGS. 4A-4D and described immediately above. These one or more formal engines may then calculate the first set of exit stimuli for the first clock cycle from the candidate state by sweeping the pertinent state space 112 to determine whether the electronic design may successfully exit the candidate state with the first set of exit stimuli at the end of the first clock cycle.

For example, these formal verification techniques may verify whether the aforementioned cover property (cov_exit: cover property (fsm !=BUSY) that will be referred to as an exit cover property) may be satisfied by the first set of exit stimuli obtained by sweeping the pertinent state space 112. In this example, the absence of a circle within 112 indicates that the aforementioned exit cover property cannot be satisfied during the first clock cycle, and thus the electronic design fails to successfully exit the candidate state at the end of the first clock cycle from the candidate state.

It shall be noted that these one or more formal engines identified three deadlock candidates in the examples illustrated in FIGS. 4A-4D, and that FIG. 4F illustrates the initiation of a second search with formal verification techniques. Nonetheless, these three deadlock candidates may be similarly sequentially, in parallel, or in a distributed manner; and for each deadlock candidate, a separate search is initiated to use formal verification techniques to sweep the pertinent state space to determine whether the deadlock candidate is a real deadlock. In addition, the first search may continue beyond the fourth clock cycle and try to find additional deadlock candidates beyond the first three clock cycles illustrated in these examples.

Figure 4G:
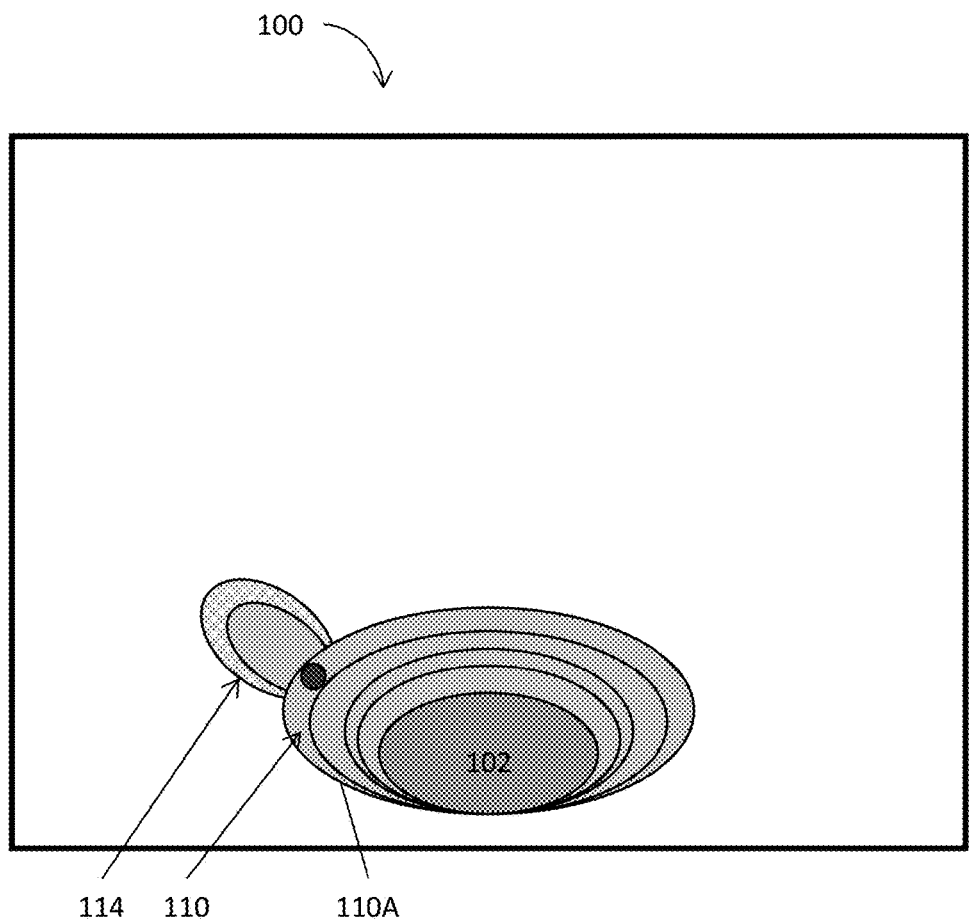

FIG. 4G illustrates that these formal verification techniques may continue with the second search to calculate the second set of exit stimuli by sweeping the pertinent state space 114 for the electronic design during the second clock cycle. Similar to FIG. 4F, the absence of a circle within the pertinent state space 114 indicates that the aforementioned exit cover property cannot be satisfied during the second clock cycle, and thus the electronic design again fails to successfully exit the candidate state at the end of the second clock cycle from the candidate state. The one or more formal engines may continue with the second search with the formal verification techniques to the next clock cycle as illustrated in FIG. 4H that is described immediately below.

Figure 4H:
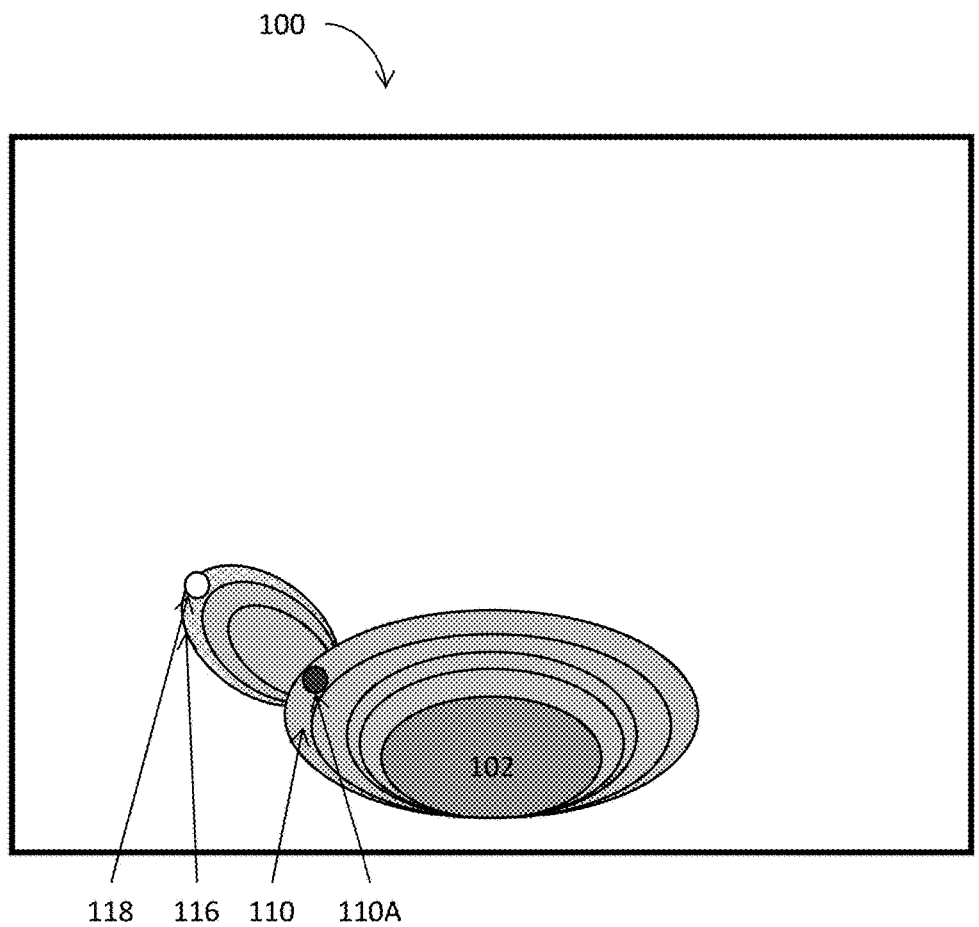

FIG. 4H illustrates that these formal verification techniques continue with the second search to calculate the third set of exit stimuli by sweeping the pertinent state space 116 for the electronic design during the second clock cycle. Unlike FIGS. 4F-4G, these one or more formal engines determine that the aforementioned exit cover property is satisfied in one occurrence 118 during the third clock cycle, and thus the electronic design successfully exits the candidate state at the end of the third clock cycle from the candidate state. In this example illustrated in FIG. 4H, the deadlock candidate 110A is determined not to be a real deadlock because there exists at least one stimulus that enables the electronic design under test to successfully exit the deadlock at the end of the third clock cycle from the candidate state corresponding to the deadlock candidate 110A.

Figure 4I:
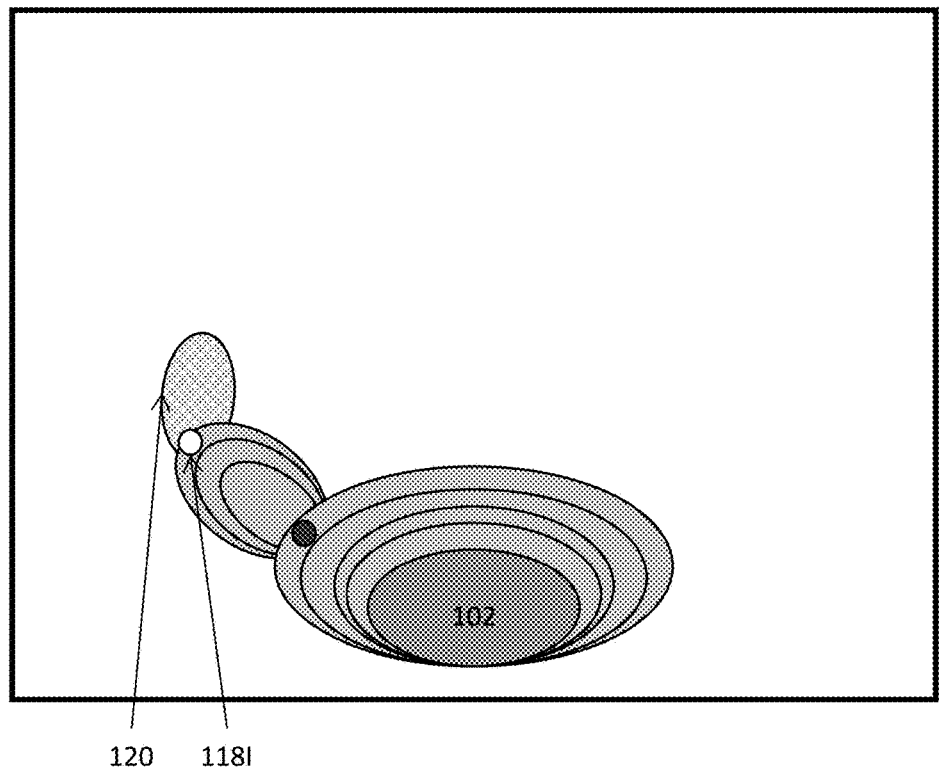

FIG. 4I illustrates an example where the one or more formal engines continue to perform a second search from the point where the electronic design under test exited the first deadlock candidate. In this example, this third search functions in a nearly identical manner as that of the first search but uses the state 118I corresponding to the occurrence 118 as an initial state instead of the original initial state 102. Another option would be to continue the original first search from initial state 102. In the case illustrated in FIG. 4I (where 118I used as the initial state for the second search), the one or more formal engines may then calculate a first set of stimuli by sweeping the pertinent state space 120 for the first clock cycle after the exit state represented by 118I by using an identical or substantially similar approach described above.

That is, the one or more formal engines may again determine that the electronic design under test may enter another deadlock candidate state. In this example, the absence of a deadlock candidate within the swept state space 120 during the first clock cycle from 118I indicates that the aforementioned stuck cover property cannot be satisfied during the first clock cycle after the exit state, and thus the electronic design does not enter a second deadlock candidate state at the end of the first clock cycle from the exit state. The one or more formal engine may then continue with the third search as illustrated in FIG. 4J below.

Figure 4J:
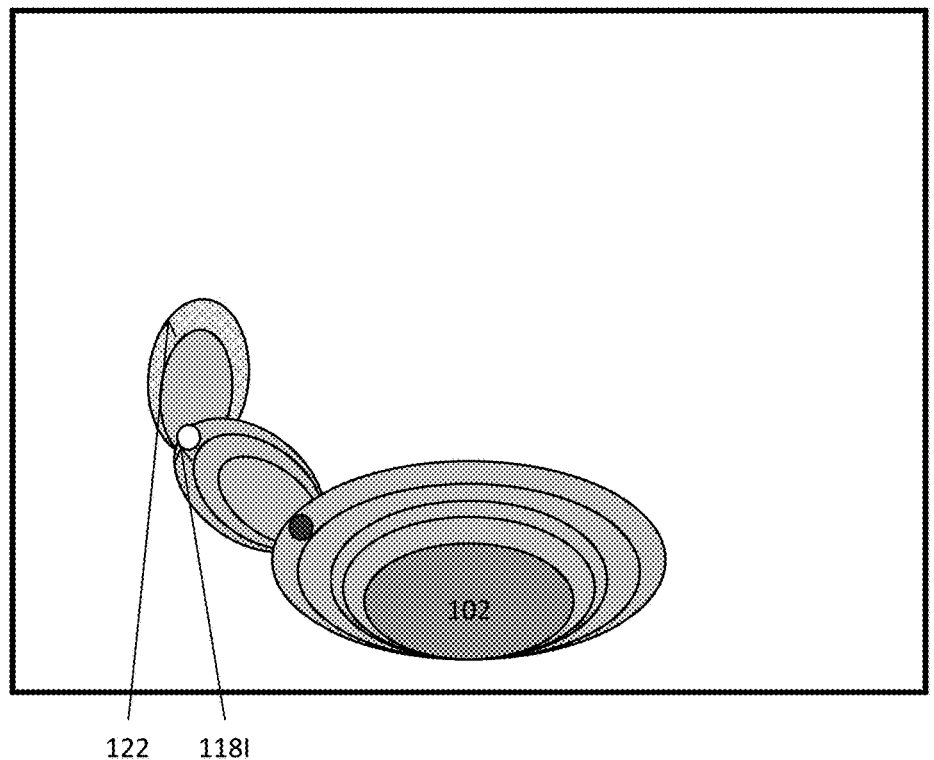

FIG. 4J illustrates that the one or more formal engines continue with the third search to determine a second set of exit stimuli by sweeping the pertinent state space 122. Similar to FIG. 4I, the absence of a deadlock candidate within the swept state space 122 during the second clock cycle from 118I indicates that the aforementioned stuck cover property cannot be satisfied during the second clock cycle after the exit state, and thus the electronic design does not enter a second deadlock candidate state at the end of the second clock cycle from the exit state. The one or more formal engine may further continue with the third search as illustrated in FIG. 4K below.

Figure 4K:
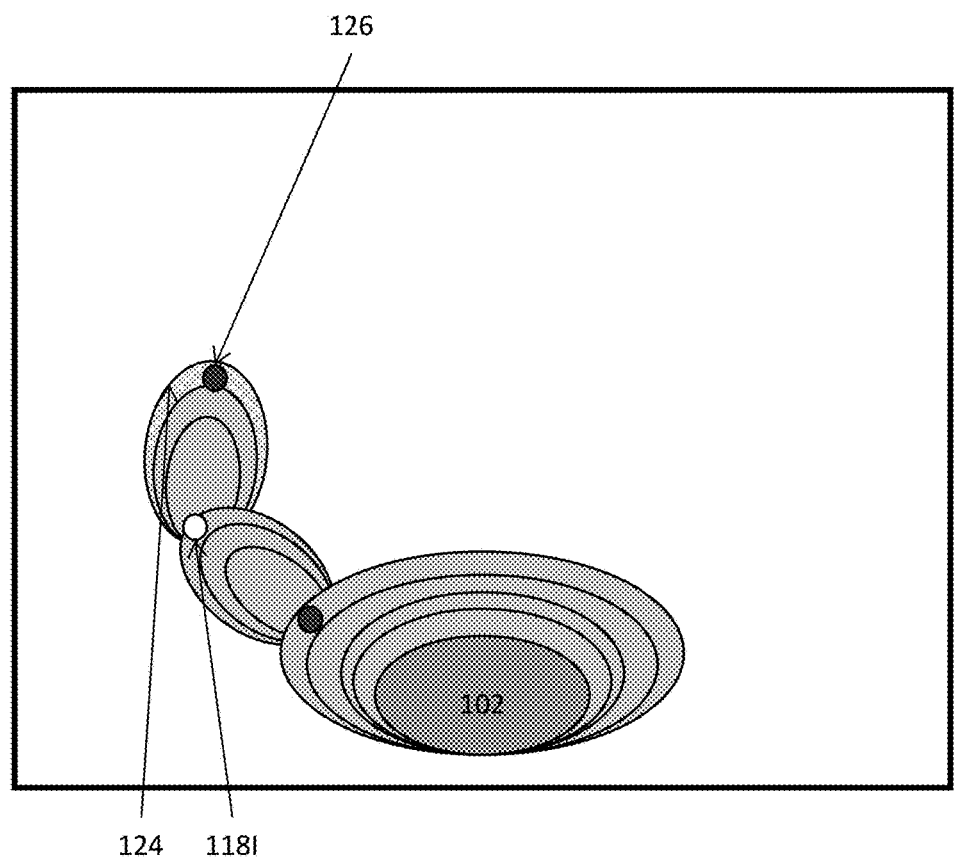

FIG. 4K illustrates that these formal verification techniques continue with the third search to calculate the third set of exit stimuli by sweeping the pertinent state space 124 for the electronic design during the third clock cycle. Unlike FIGS. 4I-4J, these one or more formal engines determine that the aforementioned stuck cover property is satisfied in one occurrence 126 during the third clock cycle, and thus once again the electronic design enters a second deadlock candidate state at the end of the third clock cycle from the exit state. In some other embodiments, reference numeral 126 in FIG. 4K may indicate the identification of another deadlock candidate. In these embodiments, one or more formal engines may terminate the third search, and start a fourth search to determine whether the electronic design may successfully exit the stuck state in which the electronic design remains for an extended number of clock cycles.

Figure 4L:
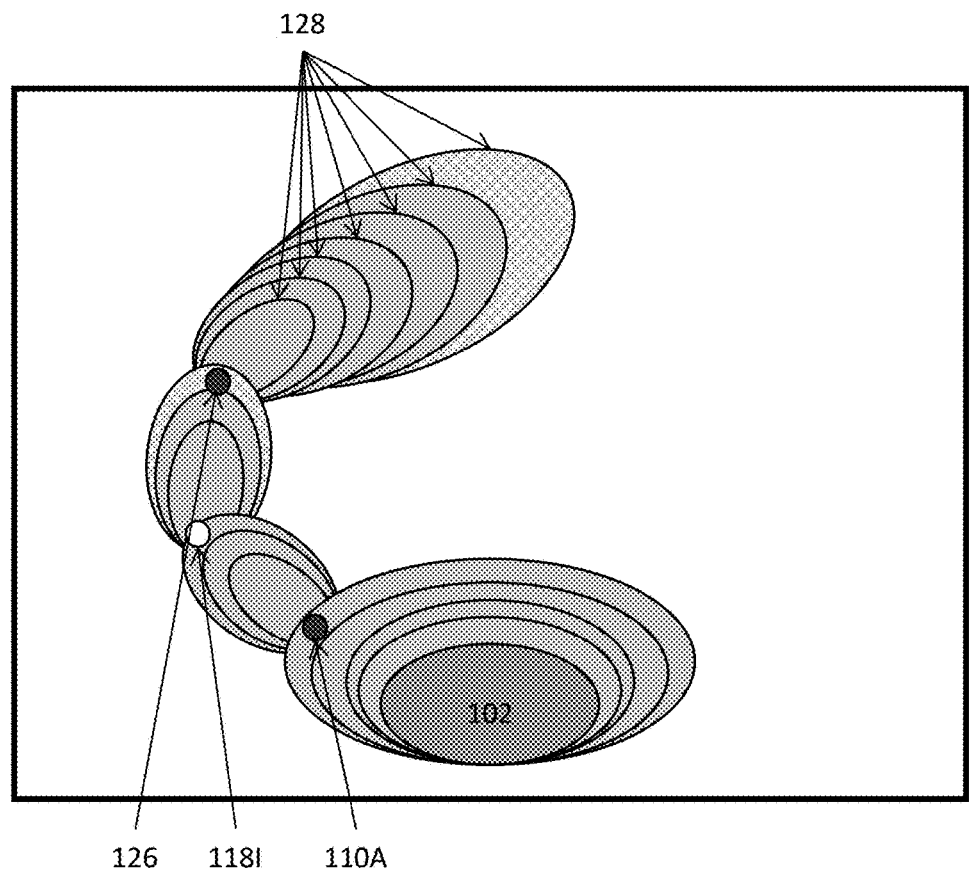

FIG. 4L illustrates an example where the one or more formal engines identified the second deadlock candidate 126 as described in the latter embodiments of the description of FIG. 4K. The one or more formal engines then terminate the third search and initiate a fourth search using formal verification techniques to determine whether the electronic design may exit the stuck state corresponding to 126. These one or more formal engines may similarly calculate a plurality of exit stimuli by sweeping pertinent state space with the state space 100 for a plurality of clock cycles.

Nonetheless, if these one or more formal engines determine that the electronic design cannot exit the second deadlock candidate 126 after these one or more formal engines have continued to sweep the pertinent state space 128 to calculate sets of stimuli applied to the electronic design under test, this deadlock candidate 126 may then be determined to be a real deadlock. This real deadlock may similarly be reported and analyzed, and the electronic design may be modified to resolve this real deadlock. In some embodiments where a threshold limit is imposed on the fourth search such that the electronic design fails to exit the stuck before the resource (time, memory, etc.) threshold limit has been reached, the deadlock candidate 126 may be considered as a possible deadlock because the search terminates because the threshold limit has been reached, not necessarily because the electronic design cannot exit the deadlock candidate state if further search is performed.

FIGS. 4M-4S illustrate some example screen shots of a user interface coupled to the deadlock detection engine and a plurality of formal engines in some embodiments. The example screen shot 402 in FIG. 4M shows that, after the initial state of an electronic design under test has been loaded, a user provides a signal of interest "buffer_full" to the formal engine that checks whether the buffer remains full (e.g., the buffer_full signal remains at high or "1'b1") for an extended number of clock cycles. In this example, the extended number of clock cycles is predetermined to be 50 clock cycles. It shall be noted that the extended number of clock cycles of 50 clock cycles is used here strictly as an example, and that other numbers of clock cycles may be determined and used based in part or in whole upon, for example, the confidence level of the determination that the buffer is in a real deadlock once the buffer_full signal remains high ("1'b1") for the extended number of clock cycles.

FIG. 4N illustrates the example screen shot 404 where the deadlock detection module responds by indicating that the deadlock detection module automatically generates a cover property (or an assertion) for one or more formal engines to check whether the buffer remains full for 50 clock cycles. For example, a deadlock detection module may determine the cover property to be as follows:

cov_stuck: cover property (buffer_full==1'b1 [*50])

This automatically generated cover property will be tested with one or more formal engines to determine whether this cover property is covered or found with one or more stimuli generated by sweeping the state space of the electronic design under test.

Figure 4O:
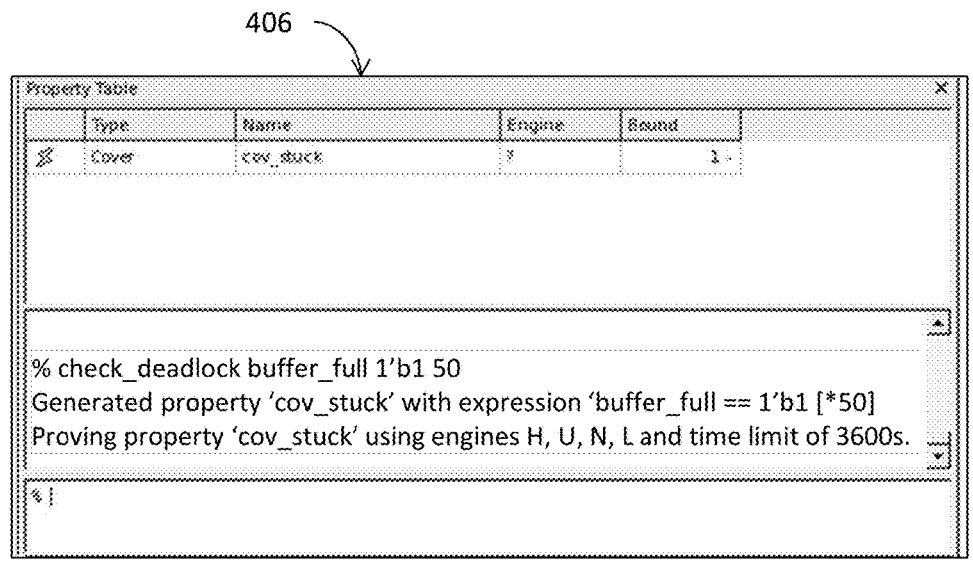

FIG. 4O illustrates the example screen shot 406 where the deadlock detection module in tandem with a plurality of formal engines having respective formal engine identifiers H, U, N, and L sweep the state space of the electronic design from, for example, the initial state to determine whether the automatically generated cover property "cov_stuck" is covered or found. This example screen shot 406 further illustrates that the time limit for testing this cover property is set to 3,600 seconds. If the plurality of formal engines do not find any stimuli that satisfy the cover property within the time limit, the buffer may be determined not to be in a deadlock state. It shall be noted that the time limit of 3,600 seconds is used here strictly as an example, and that other time limits may be determined and used based in part or in whole upon, for example, the confidence level of the determination that the buffer is not in a deadlock state if the plurality of formal engines cannot find any stimuli to satisfy the cover property during the given time limit.

Figure 4P:
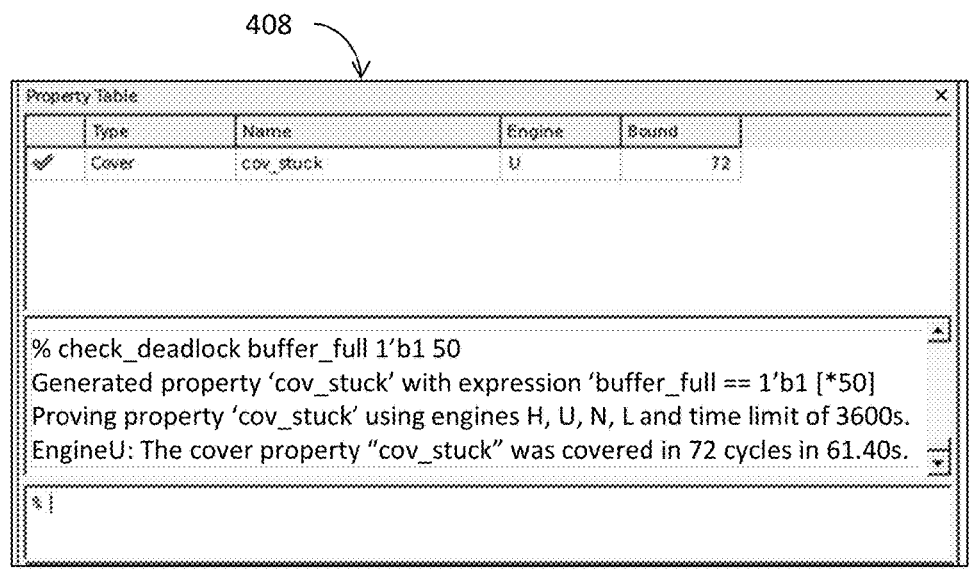

FIG. 4P illustrates the example screen shot 408 where the plurality of formal engines (H, U, N, and L) sweep the state space (e.g., from the initial state of the electronic design) or use other techniques (e.g., simulation techniques, emulation techniques, etc.) and determine whether the cover property is satisfied during the provided time limit of 3,600 seconds. Further, this example screen shot 408 further illustrates that one of the formal engines, Formal Engine U, reports that the cover property "cov_stuck" was covered, found, or satisfied in 72 clock cycles in 61.40 seconds. For example, Formal Engine U may sweep the state space from the initial state of the electronic design and find that the cover property is not satisfied during the first 22 clock cycles but remains at "high" or "1'b1" from clock cycle 23 through clock cycles 72 for a total of 50 clock cycles. The finding that the buffer remains at remains at "high" or "1'b1" for 50 clock cycles satisfies the cover property, and that Formal Engine U thus reports that the buffer is in a deadlock candidate state as shown in the example screen shot 408. As described above, these techniques may now terminate the first search for deadlock candidates upon or shortly after the identification of this deadlock candidate. A separate search with formal verification techniques may be initiated to determine whether the identified deadlock candidate is a real deadlock, a false deadlock, or a possible deadlock.

FIG. 4Q illustrates the example screen shot 410 where, upon the determination the deadlock detection module then automatically generates another cover property in a separate formal search as follows for a plurality of formal engines (formal engines H, T, and N) to determine whether the electronic design may exit the deadlock candidate state within a predetermined time limit of 3,600 seconds.

cov_exit: cover property (buffer_full !=1'b1)

This "cov_exit" cover property will be tested by the plurality of formal engines to determine whether the electronic design successfully exits the deadlock candidate state within the given time limit.

FIG. 4R illustrates the example screen shot 412 where a second search is initiated with formal engines (H, T, and N) to determine whether the electronic design may exit the deadlock candidate state within a predetermined time limit of 3,600 seconds. If at least one of the plurality of formal engines H, T, and N finds a stimulus that satisfies the exit cover property within the time limit, then the deadlock candidate found by Formal Engine U is determined to be a false deadlock. On the other hand, if the plurality of formal engines are able to formally prove that there is no stimuli that could ever satisfy the exit cover property, then the exit cover is determined to be unreachable, and the deadlock candidate found by Formal Engine U is determined to be a real deadlock. If the plurality of formal engines does not find a stimulus to satisfy the exit cover nor find a formal proof that the exit cover is unreachable before the time limit is reached, then the deadlock candidate is classified as a potential deadlock. Similar to the first time limit for a plurality of formal engines to identify a deadlock candidate, this time limit may also be determined based in part or in whole upon, for example, the confidence level of the determination that the buffer is in a real deadlock state if the plurality of formal engines cannot find any stimuli to satisfy the "cov_exit" cover property during the given time limit.

It shall be noted that the one or more first formal engines that identify deadlock candidates may be the same as or may be different from the one or more second formal engines that determine whether a deadlock candidate is a real, false, or possible deadlock in a second search. This may be because different formal engines may be configured to function more efficiently in certain tasks. In the examples illustrated in FIGS. 4M-4S, formal engines H, U, N, and L may be configured to function more efficiently in identifying deadlock candidates, while formal engines H, T, and N may be configured to function more efficiently in determining whether deadlock candidates are real, false, or possible deadlocks.

FIG. 4S illustrates the example screen shot 414 where Formal Engine N sweeps the state space from the deadlock candidate state to calculate and apply stimuli to the electronic design under test in order to determine whether the electronic design may exit the deadlock candidate state within the given time limit of 3,600 seconds. In this example, Formal Engine N reports that the "cov_exit" cover property has been proven to be unreachable in 128.09 seconds, within the given time limit of 3,600 seconds. That is, Formal Engine N determines that the condition that the electronic design under test to successfully exit the deadlock candidate can never be satisfied. Therefore, the deadlock candidate identified by Formal Engine U may now be confirmed to be a real deadlock.

Figure 5:
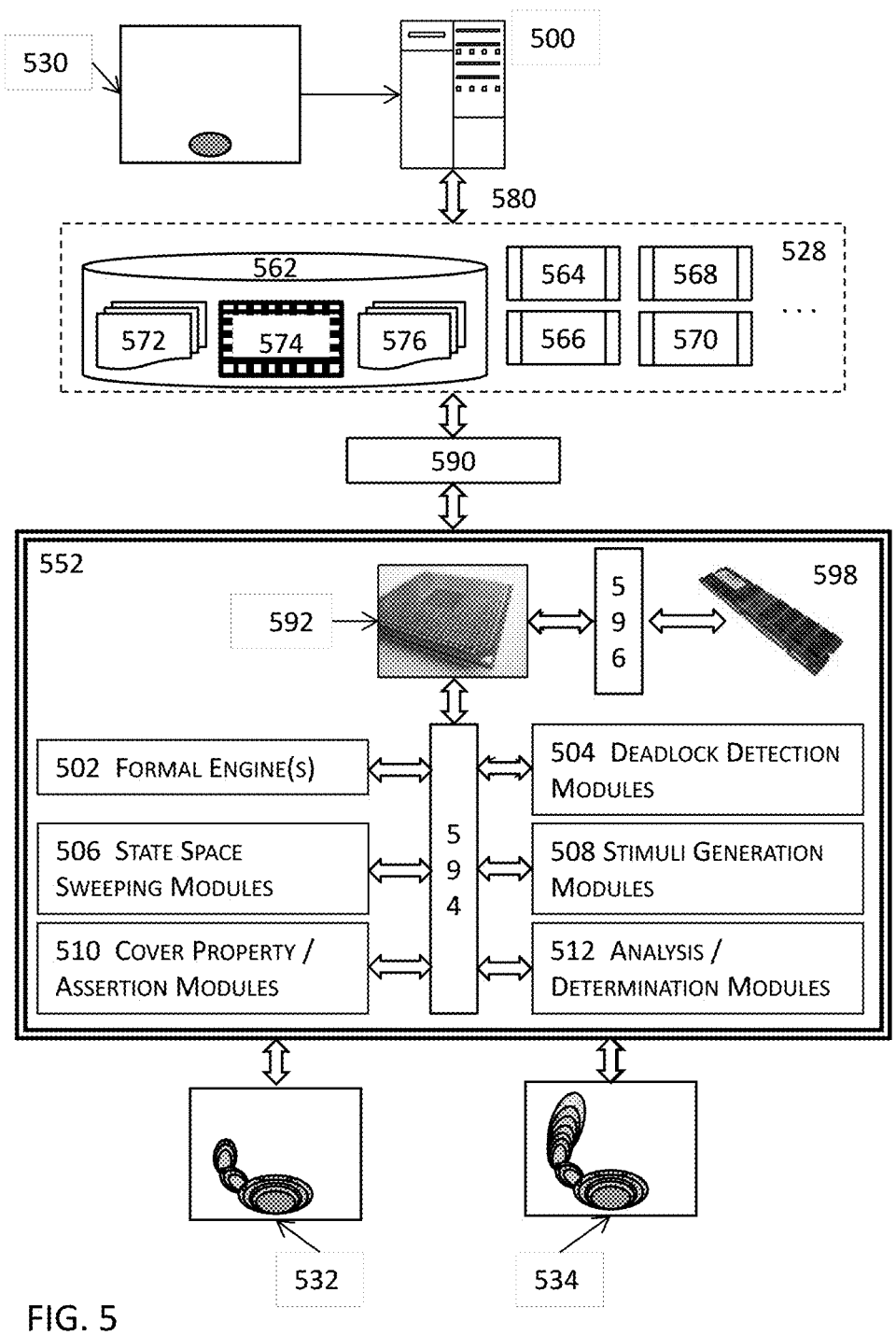
FIG. 5 illustrates another high level block diagram of a simplified system for implementing deadlock detection with formal verification techniques in an electronic design in one or more embodiments.

FIG. 5 illustrates another high level block diagram of a simplified system for implementing deadlock detection with formal verification techniques in an electronic design in one or more embodiments. In these one or more embodiments, the hardware system in FIG. 5 may comprise one or more computing systems 500, such as one or more general purpose computers described in the System Architecture Overview section to implement one or more special proposes. The illustrative system in FIG. 5 may include an Internet-based computing platform providing a shared pool of configurable computer processing resources (e.g., computer networks, servers, storage, applications, services, etc.) and data to other computers and devices in an ubiquitous, on-demand basis via the Internet. For example, one or more computing resources and/or modules illustrated in FIG. 5 may be located in a cloud computing platform in some embodiments.

In some embodiments, the one or more computing systems 500 may invoke various system resources such as the processor(s) or processor core(s), memory, disks, etc. and receive an electronic design having a state space 530 for deadlock detection. The one or more computing systems 500 invoke one or more formal engines 502 to apply formal verification techniques that first initiate a search for deadlock candidates with stimuli calculated by sweeping the state space of an electronic design under test. If the formal verification techniques determine that the electronic design remains in a particular state for a predetermined number of clock cycles, this particular state corresponds to a deadlock candidate.

Upon the identification of one or more deadlock candidates during the first search, the one or more computing systems 500 then initiate a second search to determine whether the electronic design under test may exit a particular state in which the electronic design has remained for a number of clock cycles. If the electronic design, after remaining in a particular state for a predetermined number of clock cycles, may successfully exit (e.g., 532) the particular state during the second search with the formal verification techniques, the deadlock candidate may be determined not to be a real deadlock. On the other hand, if the electronic design cannot exit the particular state within a state space sweep limit during the second search with the formal verification techniques (e.g., 534), the deadlock candidate may be determined to be a real deadlock. Real deadlocks and optionally deadlock candidates may be stored in persistent or non-persistent computer readable storage medium and may be reported for further review or analyses.

The one or more computing systems 500 may further write to and read from a local or remote non-transitory computer accessible storage 562 that stores thereupon data or information such as, but not limited to, one or more data structures or databases (574) such as schematic design database(s) or physical design database(s), electronic circuit design specification database(s), various statistics, various data, rule decks, various design rules, constraints, etc. (572), or other information or data (576) that may be used to facilitate the performance of various functions to achieve the intended purposes.

The one or more data structures or databases 574 may include various cover properties, assertions, etc. or templates thereof that may be used during with the formal verification techniques. The one or more data structures or databases 574 may further include persistent or non-persistent information such as various states of an electronic design under test, various stimuli, etc.

In some embodiments, the one or more computing systems 500 may include or, either directly or indirectly through the various resources 528, invoke a set of mechanisms or modules 552 including hardware and software modules or combinations of one or more hardware and one or more software modules that are stored at least partially in computer memory may comprises one or more formal engines 502 to perform verification on an electronic design using formal verification techniques. The formal verification techniques described herein are distinguishable from simulation and emulation techniques in that the formal verification techniques sweep the pertinent state space of an electronic design to calculate stimuli and examine the behaviors of the electronic design in response to the stimuli for verifying the electronic design, whereas simulation or emulation techniques receive user provided inputs to the electronic design, determine the behaviors of the electronic design in response to the received user provided inputs, and verify the electronic design based on the behaviors. In other words, the formal verification techniques provides complete or nearly complete (e.g., depending on the state space sweep limit) coverage of the state space of an electronic design under test, whereas simulation or emulation techniques randomly walk the state space in response to user provided inputs and thus hit desired states (e.g., deadlocks) that the user provided inputs may lead to but not the state space that the user provided inputs fail to cover.

The one or more computing systems 500 may also initiate or interact with other computing systems to access, via a computer bus architecture (e.g., a system bus, a control bus, a data bus, or any combinations thereof), various resources 528 that may comprise a floorplanner, a placement module, a global routing module, and/or a detail routing module 564, a layout editor 566, a design rule checker 568, a verification engine 570, etc.

The set of modules 552 may further include one or more deadlock detection modules 504 that function either independently or in tandem with one or more other modules to detect deadlock candidates and real deadlocks. The set of modules 552 may further optionally include one or more state space sweeping modules 506 to sweep pertinent state space for the determination or calculation of stimuli. In addition or in the alternative, the set of modules 552 may further include one or more stimuli generation modules 508 that function in tandem with the one or more state space sweeping module to calculate or determine one or more sets of stimuli that are provided to the electronic design as inputs.

For example, a stimuli generation module may generate a set of stimuli for each of a plurality of clock cycles according to sweeping the pertinent state space by the state space sweeping module.

In some embodiments, the set of modules 552 may further include one or more cover property or assertion modules 510 to generate one or more cover properties or assertions for the one or more formal engines 502 to verify an electronic design under test. The set of modules 552 may also include a analysis or determination module 512 to perform various analyses or to make various determinations. Any of these modules described may be stored at least partially in memory and include or function in tandem with one or more micro-processors or one or more processor cores to perform respective functions described herein.

The set of modules 552 may further optionally include one or more signoff modules (not shown) to perform various signoff and design closure tasks to ensure that the electronic design implemented by various techniques described herein may be successfully fabricated while maintaining various performance, cost, reliability, and manufacturability requirements.

For example, the one or more signoff modules may include one or more timing signoff modules to perform timing analyses and timing closure related tasks (e.g., silicon-accurate timing signoff, signal integrity analyses, etc.) to ensure an electronic design meets power, performance, or other requirements before tapeout, one or more signoff parasitic extraction modules to provide silicon-accurate interconnect parasitic extraction and ensure first-pass silicon success, and one or more power signoff modules to perform various power integrity analyses, transistor-level electromigration and IR-drop analyses, or other power and signal integrity analyses with SPICE-level accuracy or better accuracy with SPICE or SPICE-like simulations (e.g., Fast-SPICE, HSPICE, PSPICE, or any other SPICE-based or SPICE-compatible simulations) to ensure an electronic design meets or exceeds power, performance, and/or area goals in some embodiments.

The one or more signoff modules may include one or more physical verification modules (not shown) to perform various design rule checking, layout vs. schematic (LVS), etc. tasks to ensure that an electronic design meets or exceeds various spatial and other physical rules and one or more design for manufacturing (DFM) modules to address physical signoff and electrical variability optimization, correct lithography hotspots, predict silicon contours, improve yield, detect and repair timing and leakage hotspots to achieve variation- and manufacturing-aware signoff and design closure in some of these embodiments.

In addition or in the alternative, the one or more signoff modules may include one or more one or more computational lithography modules (not shown) to provide more accurate post-etch critical dimension accuracy and process windows on silicon, reticle and wafer synthesis, etc. to eliminate errors and/or reduce mask-manufacturing cycle times. One or more of these signoff modules may operate on the electronic design produced or modified with various techniques to be described in the following sections for proper signoff and design closure so that the signoff version of the electronic design may be properly manufactured with first-pass or fewer passes silicon success in some embodiments. In these embodiments, the signoff version of the electronic design produced or modified with various techniques described herein causes the underlying electronic circuit to be manufactured by a foundry or IC (integrated circuit) fabrication facility when the signoff version of the electronic design is forwarded to the foundry or IC (integrated circuits) fabrication facility that in turn fabricates the requisite photomasks and the eventual electronic circuit.

In some embodiments, the computing system 500 may include the various resources 528 such that these various resources may be invoked from within the computing system via a computer bus 580 (e.g., a data bus interfacing a microprocessor 592 and the non-transitory computer accessible storage medium 598 or a system bus 590 between a microprocessor 592 and one or more engines in the various resources 528). In some other embodiments, some or all of these various resources may be located remotely from the computing system 500 such that the computing system may access the some or all of these resources via a computer bus 580 and one or more network components.

The computing system may also include one or more modules in the set of modules 552. These one or more modules in the set 552 may include or at least function in tandem with a microprocessor 592 via a computer bus 594 in some embodiments. In these embodiments, a single microprocessor 592 may be included in and thus shared among more than one module even when the computing system 500 includes only one microprocessor 592. A microprocessor 592 may further access some non-transitory memory 598 (e.g., random access memory or RAM) via a system bus 596 to read and/or write data during the microprocessor's execution of processes.

Various techniques described herein employ a two-step approach to detect deadlocks in hardware designs using formal technology. These techniques first use formal techniques to find cases where an electronic design remains in a single state for a predetermined number of cycles. These techniques then stop the formal verification task and invoke another separate formal task to check whether the electronic design may ever exit that particular state. If the electronic design cannot exit that particular state, then a deadlock has been found. In some embodiments, these techniques described herein do not seek to guarantee, prove, or disprove that an electronic design is deadlock-free. Rather, these techniques seek to find deadlock bugs by splitting the analysis into a two-phase analysis each with designated formal task as briefly introduced above. These techniques allow for better performance and higher accuracy in deadlock detection while conserving computational resources.

System Architecture Overview

Figure 6:
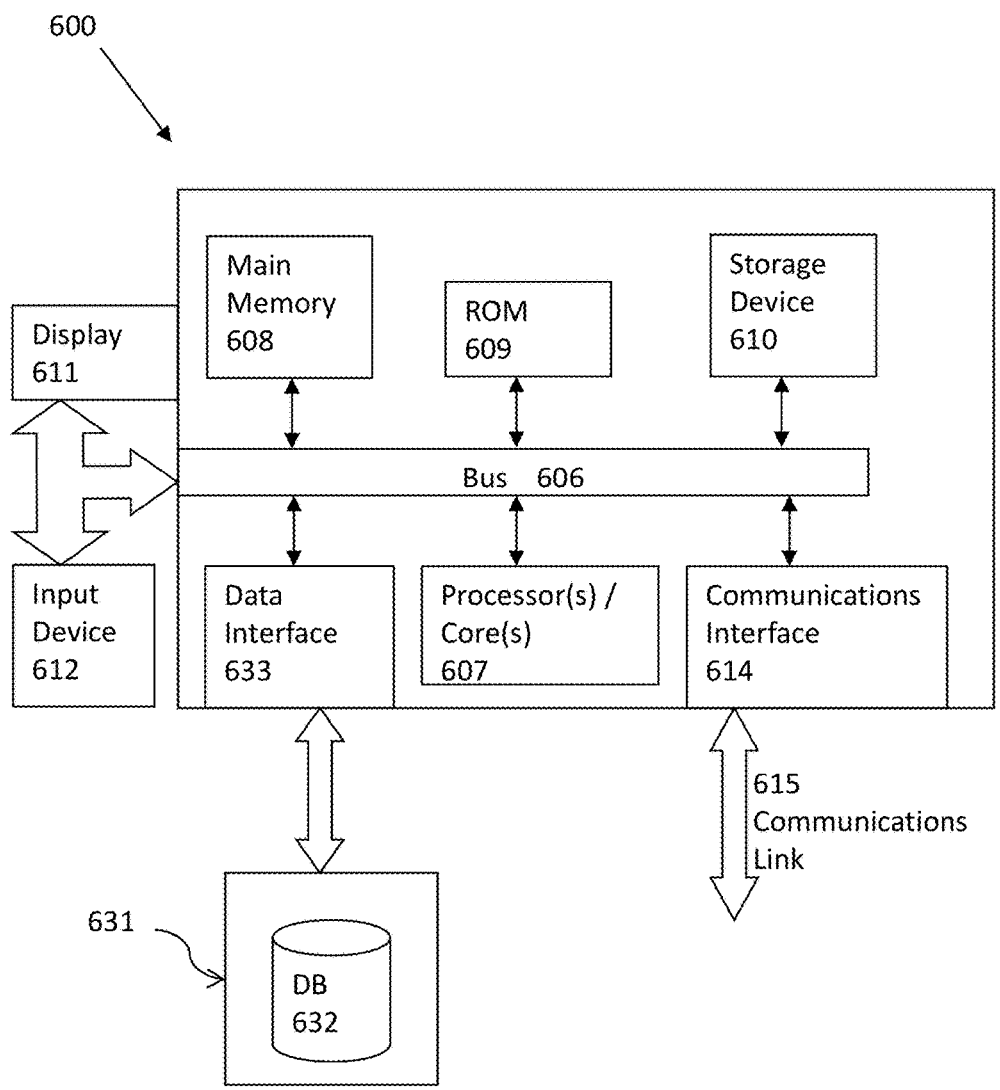
FIG. 6 illustrates a computerized system on which a method for implementing deadlock detection with formal verification techniques in an electronic design may be implemented.

FIG. 6 illustrates a computerized system on which a method for implementing deadlock detection with formal verification techniques in an electronic design may be implemented. Computer system 600 includes a bus 606 or other communication module for communicating information, which interconnects subsystems and devices, such as processor 607, system memory 608 (e.g., RAM), static storage device 609 (e.g., ROM), disk drive 610 (e.g., magnetic or optical), communication interface 614 (e.g., modem or Ethernet card), display 611 (e.g., CRT or LCD), input device 612 (e.g., keyboard), and cursor control (not shown). The illustrative computing system 600 may include an Internet-based computing platform providing a shared pool of configurable computer processing resources (e.g., computer networks, servers, storage, applications, services, etc.) and data to other computers and devices in an ubiquitous, on-demand basis via the Internet. For example, the computing system 600 may include or may be a part of a cloud computing platform in some embodiments.

According to one embodiment, computer system 600 performs specific operations by one or more processor or processor cores 607 executing one or more sequences of one or more instructions contained in system memory 608. Such instructions may be read into system memory 608 from another computer readable/usable storage medium, such as static storage device 609 or disk drive 610. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 607, where the one or more processors, one or more processor cores, or combination thereof executes one or more threads. For example, the acts of determination, extraction, stitching, simulating, annotating, analyzing, optimizing, and/or identifying, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any non-transitory medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 600. According to other embodiments of the invention, two or more computer systems 600 coupled by communication link 615 (e.g., LAN, PTSN, or wireless network) may perform the sequence of instructions required to practice the invention in coordination with one another.

Computer system 600 may transmit and receive messages, data, and instructions, including program (e.g., application code) through communication link 615 and communication interface 614. Received program code may be executed by processor 607 as it is received, and/or stored in disk drive 610, or other non-volatile storage for later execution. In an embodiment, the computer system 600 operates in conjunction with a data storage system 631, e.g., a data storage system 631 that includes a database 632 that is readily accessible by the computer system 600. The computer system 600 communicates with the data storage system 631 through a data interface 633. A data interface 633, which is coupled to the bus 606 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 633 may be performed by the communication interface 614.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for implementing deadlock detection with formal verification techniques in an electronic design, comprising:
   executing, at at least one deadlock detection module coupled to one or more micro-processors, a sequence of instructions to perform a process, the process comprising:
   identifying one or more inputs that include an initial state of an electronic design;
   identifying a deadlock candidate by searching at least a portion of a state space of the electronic design in a first formal search using formal verification techniques;
   reducing a total number of deadlock candidates into a reduced set of real deadlocks at least by determining, at the at least one deadlock detection module coupled to the one or more micro-processors, whether the deadlock candidate is a real deadlock using a second formal search with the formal verification techniques; and
   modifying the electronic design into a modified electronic design in a data structure at least by performing one or more fixes on the real deadlock.

2. The computer implemented method of claim 1, identifying the one or more inputs comprising at least one of:
   identifying the initial state of the electronic design;
   identifying one or more user specified constraints for the electronic design;
   identifying one or more state space sweeping thresholds for the formal verification techniques; or
   identifying one or more deadlock criteria.

3. The computer implemented method of claim 1, identifying the deadlock candidate comprising:
   invoking one or more formal engines; and
   initiating the first formal search at the one or more formal engines.

4. The computer implemented method of claim 3, identifying the deadlock candidate further comprising:
   sweeping a pertinent portion of the state space of the electronic design from the initial state using the formal verification techniques; and
   determining one or more sets of clock cycle-based stimuli for one or more clock cycles for the electronic design.

5. The computer implemented method of claim 4, identifying the deadlock candidate further comprising:
   determining whether one or more deadlock candidates are identified during the first formal search, the one or more deadlock candidates including the deadlock candidate.

6. The computer implemented method of claim 5, identifying the deadlock candidate further comprising:

identifying the one or more deadlock candidates when it is determined that the one or more deadlock candidates have been identified during the first formal search; and terminating the first formal search when it is determined that the one or more deadlock candidates have been identified during the first formal search.

7. The computer implemented method of claim 5, identifying the deadlock candidate further comprising:

determining whether a state space sweeping threshold has been reached when it is determined that the one or more deadlock candidates have not been identified during the first formal search; and terminating the first formal search when it is determined that the state space sweeping threshold has been reached.

8. The computer implemented method of claim 1, determining whether the deadlock candidate is the real deadlock comprising:

identifying information pertinent to the deadlock candidate; and initiating a second formal search from a candidate state corresponding to the deadlock candidate.

9. The computer implemented method of claim 8, the information pertinent to the deadlock candidate comprising first information or one or more values of the candidate state in which the electronic design remains for an extended number of clock cycles, second information about a portion or one or more devices having state values for the extended number of clock cycles in the electronic design, one or more clock cycles during which the electronic design remains for the extended number of clock cycles, or one or more stimuli provided to the electronic design and causing the deadlock candidate.

10. The computer implemented method of claim 8, determining whether the deadlock candidate is the real deadlock comprising:

sweeping at least a pertinent portion of the state space of the electronic design from the candidate state using the formal verification techniques; and determining one or more clock cycle-based sets of stimuli for the electronic design for one or more clock cycles.

11. The computer implemented method of claim 10, determining whether the deadlock candidate is the real deadlock comprising:

determining whether the electronic design exits the candidate state within a threshold limit.

12. The computer implemented method of claim 11, determining whether the deadlock candidate is the real deadlock comprising:

identifying the deadlock candidate as the real deadlock when it is determined that the electronic design fails to exit the candidate state within the threshold limit; and resolving the real deadlock by modifying the electronic design.

13. The computer implemented method of claim 11, determining whether the deadlock candidate is the real deadlock comprising:

determining whether the threshold limit has been reached when it is determined that the electronic design exits the candidate state within the threshold limit.

14. The computer implemented method of claim 13, determining whether the deadlock candidate is the real deadlock comprising:

terminating the second formal search when it is determined that the threshold limit has been reached;

identifying the deadlock candidate as a potential deadlock when it is determined that the threshold limit has been reached; and continuing to sweep a pertinent portion of the state space with the threshold limit to determine whether one or more additional deadlock candidates are identified when it is determined that the threshold limit has not been reached.

15. A system for implementing deadlock detection with formal verification techniques in an electronic design, comprising:

non-transitory computer accessible storage medium storing thereupon program code;

a deadlock detection module that is stored at least partially in memory of one or more computing systems, include or function in conjunction with at least one micro-processor of the one or more computing systems, and are configured to execute the program code to identify one or more inputs that include an initial state of an electronic design;

the deadlock detection module further executing the program code to identify a deadlock candidate by searching at least a portion of a state space of the electronic design in a first formal search using formal verification techniques;

the deadlock detection module further executing the program code to reduce a total number of deadlock candidates into a reduced set of real deadlocks at least by determining, at the at least one deadlock detection module coupled to the one or more micro-processors, whether the deadlock candidate is a real deadlock using a second formal search with the formal verification techniques; and the deadlock detection module further executing the program code to modify the electronic design into a modified electronic design in a data structure at least by performing one or more fixes on the real deadlock.

16. The system for claim 15, the deadlock detection module further executing the program code to:

invoke one or more formal engines;

initiate the first formal search at the one or more formal engines;

sweep a pertinent portion of the state space of the electronic design from the initial state using the formal verification techniques;

determine one or more sets of clock cycle-based stimuli for one or more clock cycles for the electronic design; and determine whether one or more deadlock candidates are identified during the first formal search, the one or more deadlock candidates including the deadlock candidate.

17. The system for claim 16, the deadlock detection module further executing the program code to:

identify the one or more deadlock candidates when it is determined that the one or more deadlock candidates have been identified during the first formal search;

terminate the first formal search when it is determined that the one or more deadlock candidates have been identified during the first formal search;

determine whether a state space sweeping threshold has been reached when it is determined that the one or more deadlock candidates have not been identified during the first formal search; and terminate the first formal search when it is determined that the state space sweeping threshold has been reached.

18. An article of manufacture comprising a non-transitory computer accessible storage medium having stored thereupon a sequence of instructions which, when executed by at least one processor or at least one processor core executing one or more threads, causes the at least one processor or the at least one processor core to perform a set of acts for implementing deadlock detection with formal verification techniques in an electronic design, the set of acts comprising:

executing, at a deadlock detection module coupled to a micro-processor of a computing system, a sequence of instructions to perform a process, the process comprising:

identifying one or more inputs that include an initial state of an electronic design;

identifying a deadlock candidate by searching at least a portion of a state space of the electronic design in a first formal search using formal verification techniques;

reducing a total number of deadlock candidates into a reduced set of real deadlocks at least by determining, at the at least one deadlock detection module coupled to the one or more micro-processors, whether the deadlock candidate is a real deadlock using a second formal search with the formal verification techniques; and modifying the electronic design into a modified electronic design in a data structure at least by performing one or more fixes on the real deadlock.

19. The article of manufacture of claim 18, the set of acts further comprising:

identifying information pertinent to the deadlock candidate;

initiating a second formal search from a candidate state corresponding to the deadlock candidate;

sweeping at least a pertinent portion of the state space of the electronic design from the candidate state using the formal verification techniques; and determining one or more clock cycle-based sets of stimuli for the electronic design for one or more clock cycles.

20. The article of manufacture of claim 19, the set of acts further comprising:

determining whether the electronic design exits the candidate state within a threshold limit;

identifying the deadlock candidate as the real deadlock when it is determined that the electronic design fails to exit the candidate state within the threshold limit;

resolving the real deadlock by modifying the electronic design;

determining whether the threshold limit has been reached when it is determined that the electronic design exits the candidate state within the threshold limit; and terminating the second formal search when it is determined that the threshold limit has been reached.

\* \* \* \* \*